US011188832B2

(12) United States Patent
Gervais

(10) Patent No.: US 11,188,832 B2
(45) Date of Patent: *Nov. 30, 2021

(54) METHOD AND ENVIRONMENT CONTROLLER FOR VALIDATING A PREDICTIVE MODEL OF A NEURAL NETWORK THROUGH INTERACTIONS WITH THE ENVIRONMENT CONTROLLER

(71) Applicant: Distech Controls Inc., Brossard (CA)

(72) Inventor: Francois Gervais, Lachine (CA)

(73) Assignee: DISTECH CONTROLS INC., Brossard (CA)

( * ) Notice: Subject to any disclaimer, the term of this patent is extended or adjusted under 35 U.S.C. 154(b) by 802 days.

This patent is subject to a terminal disclaimer.

(21) Appl. No.: 15/981,342

(22) Filed: May 16, 2018

(65) Prior Publication Data

US 2019/0354877 A1  Nov. 21, 2019

(51) Int. Cl.
  *G06N 5/02* (2006.01)
  *G06N 3/08* (2006.01)
  *G05B 13/02* (2006.01)

(52) U.S. Cl.
  CPC .......... *G06N 5/022* (2013.01); *G05B 13/027* (2013.01); *G06N 3/08* (2013.01)

(58) Field of Classification Search
  CPC ...................................................... G06N 3/08
  USPC ........................................................ 700/48
  See application file for complete search history.

(56) References Cited

U.S. PATENT DOCUMENTS

| 5,268,834 A | 12/1993 | Sanner et al. |
| 2007/0129917 A1 | 6/2007 | Blevins et al. |
| 2011/0295430 A1* | 12/2011 | Kouninski ............. G05D 23/24 700/278 |

(Continued)

OTHER PUBLICATIONS

Mustafaraj, et al. "Prediction of room temperature and relative humidity by auto-regressive linear and nonlinear neural network models for an open office", Energy and Buildings 43 (2011 ) pp. 1452-1460 (Year: 2011) (Year: 2011).*

(Continued)

*Primary Examiner* — Md Azad
(74) *Attorney, Agent, or Firm* — RatnerPrestia

(57) ABSTRACT

Method and environment controller for validating a predictive model of a neural network. The environment controller receives at least one environmental characteristic value and determines a plurality of input variables. At least one of the plurality of input variables is based on one among the environmental characteristic value(s). The environment controller executes an environment control software module for calculating at least one output variable based on the plurality of input variables. The environment controller transmits the plurality of input variables to a training server executing a neural network training engine using the predictive model; and receives at least one inferred output variable from the training server. Each inferred output variable corresponds to one of the at least one output variable calculated by the environment control software module. The environment controller compares each inferred output variable with the corresponding calculated output variable; and sends a feedback to the training server.

20 Claims, 18 Drawing Sheets

(56) References Cited

U.S. PATENT DOCUMENTS

| | | | | |
|---|---|---|---|---|
| 2012/0130547 A1* | 5/2012 | Fadell | ............... | G05D 23/1917 |
| | | | | 700/276 |
| 2013/0085614 A1* | 4/2013 | Wenzel | ............... | G05B 13/021 |
| | | | | 700/277 |
| 2014/0324244 A1* | 10/2014 | Musunuri | ............. | G05D 23/19 |
| | | | | 700/299 |
| 2016/0098037 A1 | 4/2016 | Zornio et al. | | |
| 2016/0341436 A1* | 11/2016 | Parker | ................. | H05B 47/155 |
| 2019/0353377 A1* | 11/2019 | Mao | ........................ | F24F 11/58 |

OTHER PUBLICATIONS

Ferreira, et al. "Neural network PMV estimation for model-based predictive control of HVAC systems", WCCI 2012 IEEE, IJCNN, Brisbane, Australia, QLD, 2012, pp. 1-8 (Year: 2012) (Year: 2012).*

Liu, et al. "A neural network evaluation model for individual thermal comfort", Energy and Buildings 39 (2007) pp. 1115-1122. (Year: 2007) (Year: 2007).*

* cited by examiner

# METHOD AND ENVIRONMENT CONTROLLER FOR VALIDATING A PREDICTIVE MODEL OF A NEURAL NETWORK THROUGH INTERACTIONS WITH THE ENVIRONMENT CONTROLLER

TECHNICAL FIELD

The present disclosure relates to the field of environment control systems. More specifically, the present disclosure relates to a method and an environment controller for validating a predictive model of a neural network through interactions with the environment controller.

BACKGROUND

Systems for controlling environmental conditions, for example in buildings, are becoming increasingly sophisticated. A control system may at once control heating and cooling, monitor air quality, detect hazardous conditions such as fire, carbon monoxide release, intrusion, and the like. Such control systems generally include at least one environment controller, which receives measured environmental characteristic values, generally from external sensors, and in turn determines set points or command parameters to be sent to controlled appliances.

For instance, a room has current environmental characteristic values, such as a current temperature and a current humidity level, detected by sensors and reported to an environment controller. A user interacts with the environment controller to provide set point(s), such as a target temperature and/or a target humidity level. The environment controller sends the set point(s) to a controlled appliance (e.g. a heating, ventilating, and/or air-conditioning (HVAC) appliance). The controlled appliance generates commands for actuating internal components (of the controlled appliance) to reach the set point(s). Alternatively, the environment controller directly determines command(s) based on the set point(s) and transmits the command(s) to the controlled appliance. The controlled appliance uses the command(s) received from the environment controller to actuate the internal components to reach the set point(s). Examples of internal components include a motor, an electrical circuit (e.g. for generating heat), a valve (e.g. for controlling an air flow), etc.

The environment controller executes one or more software module for controlling the environmental conditions in an area. A given software module has a plurality of input variables and one or more output variable. The input variables can be based on environmental characteristic values transmitted by sensors, set point(s) provided by end users, etc. The one or more output variable is used to generate command(s) sent to a controlled appliance. The software module may use various techniques for generating the output variable(s) based on the input variables, such as a mathematical formula, an algorithm, a rule engine, a combination thereof, etc.

Current advances in artificial intelligence, and more specifically in neural networks, can be taken advantage of. More specifically, a predictive model taking into consideration the plurality of input variables to infer the one or more output variable, can be generated and used by a neural network. The neural network technology is used in place of the corresponding legacy environment control software module (originally used for calculating the one or more output variable based on the plurality of input variables).

The advantage of the neural network technology is that it is more resilient to changes and unexpected conditions than a traditional software module.

However, in some cases, it may be useful to keep the legacy environment control software module and provide the capability to use the neural network technology in a non-disruptive manner. For example, the environment controller could be configured to use either one of the legacy environment control software module or the neural network technology based on specific needs.

Furthermore, during the training phase of the neural network (generation of the predictive model), the legacy environment control software module could be used to validate the predictive model by comparing the output(s) of the neural network with the output(s) of the legacy environment control software module for a given set of inputs.

Therefore, there is a need for a new method and environment controller using a neural network for bypassing a legacy environment control software module. There is also a need for a new method and environment controller for validating a predictive model of a neural network through interactions with the environment controller.

SUMMARY

According to a first aspect, the present disclosure relates to an environment controller. The environment controller comprises a communication interface and a processing unit. The processing unit receives at least one environmental characteristic value via the communication interface. The processing unit determines a plurality of input variables. At least one of the plurality of input variables is based on one among the at least one environmental characteristic value. The processing unit executes an environment control software module for calculating at least one output variable based on the plurality of input variables. The processing unit transmits via the communication interface the plurality of input variables to a training server executing a neural network training engine. The processing unit receives via the communication interface at least one inferred output variable from the training server. Each inferred output variable corresponds to one of the at least one output variable calculated by the environment control software module.

According to a second aspect, the present disclosure relates to a method for validating a predictive model of a neural network with an environment control software module. The method comprises receiving at least one environmental characteristic value via a communication interface of the environment controller. The method comprises determining by a processing unit of the environment controller a plurality of input variables. At least one of the plurality of input variables is based on one among the at least one environmental characteristic value. The method comprises executing by the processing unit an environment control software module for calculating at least one output variable based on the plurality of input variables. The method comprises transmitting by the processing unit via the communication interface the plurality of input variables to a training server executing a neural network training engine using the predictive model. The method comprises receiving by the processing unit via the communication interface at least one inferred output variable from the training server. Each inferred output variable corresponds to one of the at least one output variable calculated by the environment control software module.

According to a third aspect, the present disclosure relates to a non-transitory computer program product comprising instructions executable by a processing unit of an environment controller. The execution of the instructions by the processing unit provides for validating a predictive model of a neural network with an environment control software module by implementing the aforementioned method.

In a particular aspect, the environment controller compares each inferred output variable with the corresponding calculated output variable; and sends a feedback to the training server.

BRIEF DESCRIPTION OF THE DRAWINGS

Embodiments of the disclosure will be described by way of example only with reference to the accompanying drawings, in which.

DETAILED DESCRIPTION

Figure 1:
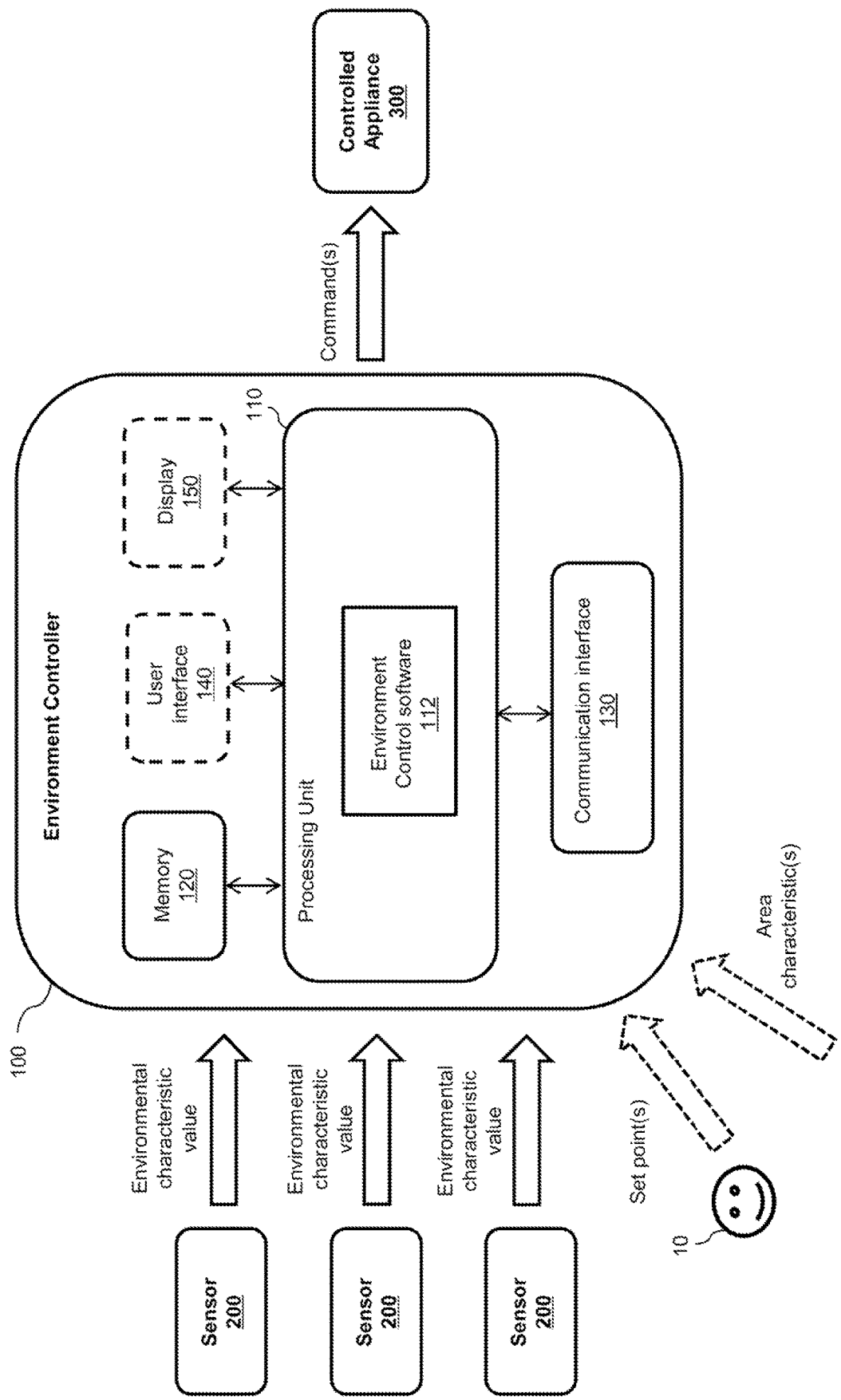
FIG. 1 illustrates an environment controller capable of controlling an appliance based on environmental characteristic values received from sensors.

The foregoing and other features will become more apparent upon reading of the following non-restrictive description of illustrative embodiments thereof, given by way of example only with reference to the accompanying drawings.

Various aspects of the present disclosure generally address one or more of the problems related to the replacement of a legacy environment control software module (executed by an environment controller) by Artificial Intelligence means, such as a neural network. More specifically, the present disclosure describes a smooth transition path allowing to use the neural network in place of the legacy environment control software module with minimal impact on the software executed by the environment controller. Furthermore, the present disclosure also describes a validation procedure using the legacy environment control software module to validate a predictive model of the neural network.

Terminology

The following terminology is used throughout the present disclosure:

Environment: condition(s) (temperature, humidity, pressure, oxygen level, carbon dioxide level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Environmental state: a current condition of an environment based on an environmental characteristic, each environmental state may comprise a range of values or verifiable representation for the corresponding environmental characteristic.

VAV appliance: A Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Area of a building: The expression 'area of a building' is used throughout the present specification to refer to the interior of a whole building or a portion of the interior of the building such as, without limitation: a zone, a floor, a room, an aisle, etc.

Environment Controller without AI Means

Referring now concurrently to FIGS. 1, 2, 3 and 6, an environment controller 100 (represented in FIGS. 1 and 2), an environment control software module 112' (represented in FIG. 3) and an environment control method (represented in FIG. 6) are illustrated.

The environment controller 100 comprises a processing unit 110, memory 120, a communication interface 130, optionally a user interface 140, and optionally a display 150.

The environment controller 100 may comprise additional components not represented in FIG. 1 for simplification purposes.

The processing unit 110 comprises one or more processor (not represented in FIG. 1) capable of executing instructions of a computer program. Each processor may further comprise one or several cores.

The memory 120 stores instructions of computer program(s) executed by the processing unit 110, data generated by the execution of the computer program(s), data received via the communication interface 130, data received via the optional user interface 140, etc. Only a single memory 120 is represented in FIG. 1, but the environment controller 100 may comprise several types of memories, including volatile memory (such as a volatile Random Access Memory (RAM), etc.) and non-volatile memory (such as a hard drive, electrically-erasable programmable read-only memory (EEPROM), etc.).

The communication interface 130 allows the environment controller 100 to exchange data with several devices (e.g. one or more sensor 200, one or more controlled appliance 300, etc.) over one or more communication network (not represented in FIG. 1 for simplification purposes). The term communication interface 130 shall be interpreted broadly, as supporting a single communication standard/technology, or a plurality of communication standards/technologies. Examples of communication interfaces 130 include a wireless (e.g. Wi-Fi, cellular, wireless mesh, etc.) communication module, a wired (e.g. Ethernet) communication module, a combination of wireless and wired communication modules, etc. In an exemplary configuration, the communication interface 130 of the environment controller 100 has a first wireless (e.g. Wi-Fi) communication module for exchanging data with the sensor(s) and the controlled appliance(s), and a second wired (e.g. Ethernet) communication module for exchanging data with other computing devices not represented in FIG. 1 for simplification purposes. The communication interface 130 usually comprises a combination of hardware and software executed by the hardware, for implementing the communication functionalities of the communication interface 130.

The steps of the method 500 are implemented by the environment controller 100, to generate command(s) for controlling the controlled appliance 300 based on environment characteristic values received from the sensors 200.

A dedicated computer program has instructions for implementing the steps of the method 500. The instructions are comprised in a non-transitory computer program product (e.g. the memory 120) of the environment controller 100. The instructions, when executed by the processing unit 110 of the environment controller 100, provide for generating command(s) for controlling the controlled appliance 300 based on environment characteristic values received from the sensors 200. The instructions are deliverable to the environment controller 100 via an electronically-readable media such as a storage media (e.g. CD-ROM, USB key, etc.), or via communication links (e.g. via a communication network through the communication interface 130).

Figure 2:
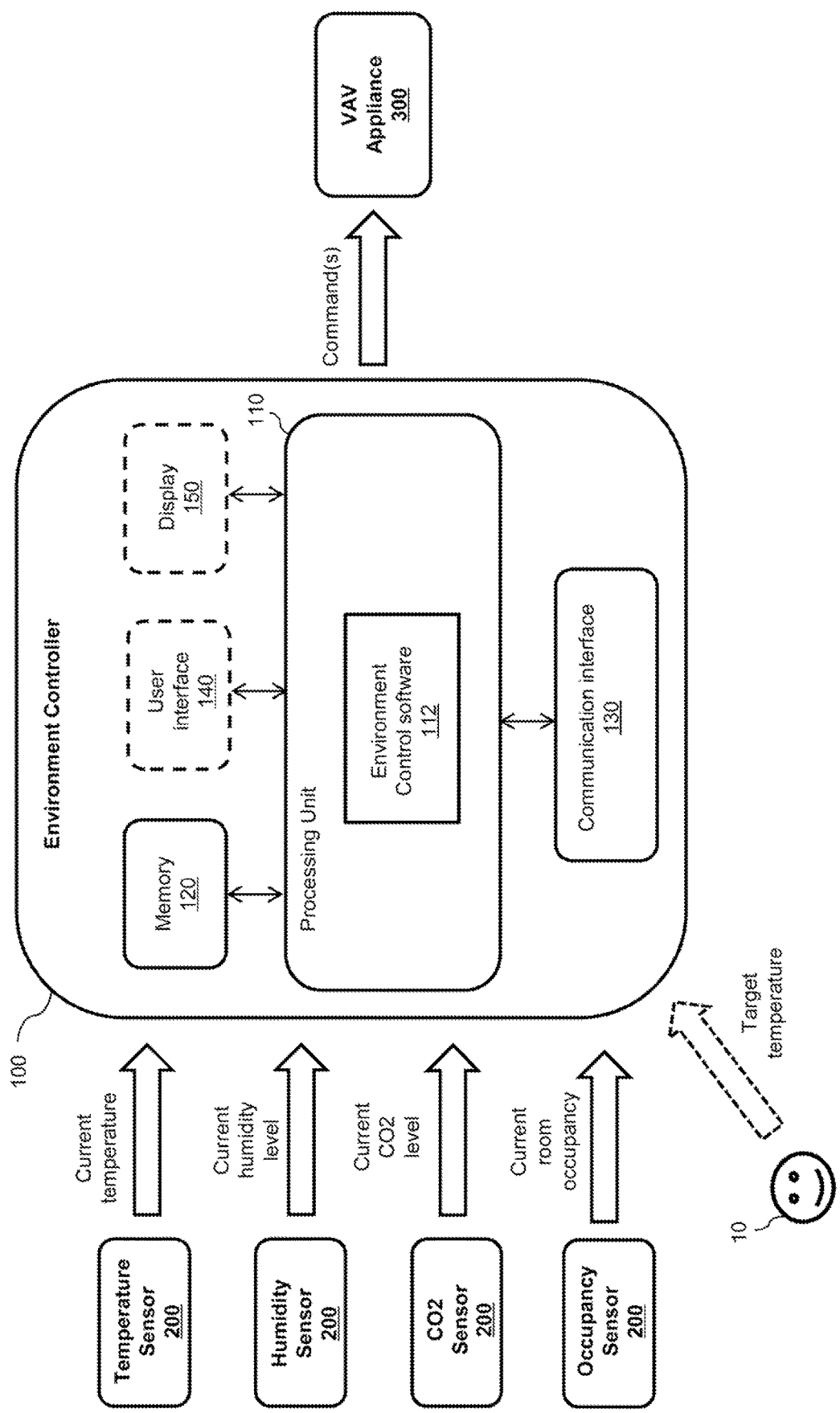
FIG. 2 illustrates an exemplary environment control system where the environment controller of FIG. 1 is deployed.
Figure 3:
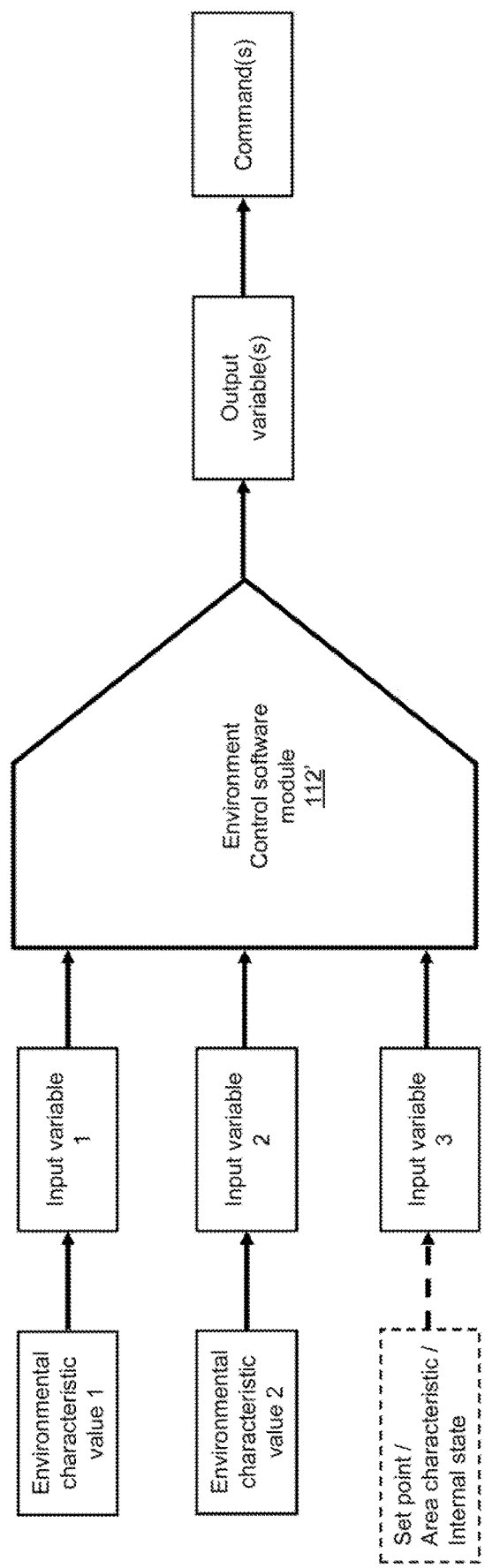
FIG. 3 illustrates an environment control software module executed by the environment controller of FIG. 1.

The dedicated computer program having instructions for implementing the steps of the method 500 is illustrated by the environment control software 112 represented in FIGS. 1 and 2. The terms computer program and software are used interchangeably in the present disclosure. The environment control software module 112' represented in FIG. 3 is a software module of the environment control software 112. The environment control software 112 comprises additional software modules (not represented in the Figures for simplification purposes) interacting with the environment control software module 112' for implementing the steps of the method 500.

Also represented in FIG. 1 are the sensors 200. Although not represented in FIG. 1 for simplification purposes, the sensors 200 comprise at least one sensing module for detecting an environmental characteristic, and a communication interface for transmitting to the environment controller 100 an environmental characteristic value corresponding to the detected environmental characteristic. The environmental characteristic value is transmitted over a communication network and received via the communication interface 130 of the environment controller 100. The sensors 200 may also comprise a processing unit for generating the environmental characteristic value based on the detected environmental characteristic.

FIG. 2 illustrates examples of sensors 200 and corresponding examples of transmitted environmental characteristic value(s). The examples include a temperature sensor 200, capable of measuring a current temperature and transmitting the measured current temperature to the environment controller 100. The examples also include a humidity sensor 200, capable of measuring a current humidity level and transmitting the measured current humidity level to the environment controller 100. The examples further include a carbon dioxide ($CO_2$) sensor 200, capable of measuring a current $CO_2$ level and transmitting the measured current $CO_2$ level to the environment controller 100. The examples also include a room occupancy sensor 200, capable of determining a current occupancy of a room and transmitting the determined current room occupancy to the environment controller 100. The room comprises the sensors 200 and the controlled appliance 300. The environment controller 100 may or may not be present in the room (the environment controller 100 may remotely control the environment of the room, which includes controlling the controlled appliance 300 based on the data transmitted by the sensors 200).

The aforementioned examples of sensors 200 are for illustration purposes only, and a person skilled in the art would readily understand that other types of sensors 200 could be used in the context of an environment control system managed by the environment controller 100. Furthermore, each environmental characteristic value may consist of either a single value (e.g. current temperature of 25 degrees Celsius), or a range of values (e.g. current temperature from 25 to 26 degrees Celsius).

The temperature, humidity and $CO_2$ sensors are well known in the art, and easy to implement types of sensors. With respect to the occupancy sensor, its implementation may be more or less complex, based on its capabilities. For example, a basic occupancy sensor (e.g. based on ultrasonic or infrared technology) is only capable of determining if a room is occupied or not. A more sophisticated occupancy sensor is capable of determining the number of persons present in a room; and may use a combination of camera(s) and pattern recognition software for this purpose. Consequently, in the context of the present disclosure, a sensor 200 shall be interpreted as potentially including several devices cooperating for determining an environmental characteristic value (e.g. one or more camera collaborating with a pattern recognition software executed by a processing unit for determining the current number of persons present in the room).

Also represented in FIG. 1 is the controlled appliance 300. Although not represented in FIG. 1 for simplification purposes, the controlled appliance 300 comprises at least one actuation module, and a communication interface for receiving one or more command from the environment controller 100. The actuation module can be of one of the following type: mechanical, pneumatic, hydraulic, electrical, electronical, a combination thereof, etc. The one or more command controls operations of the at least one actuation module. The one or more command is transmitted over a communication network via the communication interface 130 of the environment controller 100. The controlled appliance 300 may also comprise a processing unit for controlling the operations of the at least one actuation module based on the received one or more command.

FIG. 2 illustrates an example of a controlled appliance 430, consisting of a VAV appliance. Examples of commands transmitted to the VAV appliance 300 include commands directed to one of the following: an actuation module controlling the speed of a fan, an actuation module controlling the pressure generated by a compressor, an actuation module controlling a valve defining the rate of an airflow, etc. This example is for illustration purposes only, and a person skilled in the art would readily understand that other types of controlled appliances 300 could be used in the context of an environment control system managed by the environment controller 100.

A command sent to the controlled appliance 300 shall be interpreted broadly, as comprising the command itself along with zero, one or more parameter. Thus, examples of commands include: set the speed of a fan to 15 revolutions per second, increase the speed of the fan by 5 revolutions per second, decrease the speed of the fan by 10 revolutions per second, stop the rotation of the fan, etc.

The method 500 comprises the step 505 of receiving at least one environmental characteristic value via the communication interface 130. This step is performed by the environment control software 112 executed by the processing unit 110 of the environment controller 100. The environmental characteristic values are received from the sensors 200. In a particular implementation (not represented in FIGS. 1 and 2 for simplification purposes), one or more sensor is directly integrated to the environment controller 100. For these integrated sensors, the environmental characteristic values are transmitted via a communication bus internal to the environment controller 100. The internal communication bus is an additional component of the communication interface 130.

The method 500 comprises the step 510 of determining a plurality of input variables. At least one of the plurality of input variables is based on one among the at least one environmental characteristic value determined at step 505. This step is performed by the environment control software 112 executed by the processing unit 110. FIG. 3 illustrates a first and a second input variable respectively based on environment characteristic values, and a third input variable not based on environment characteristic values. The total number of input variables may vary, as well as the proportion of input variables being based on environment characteristic values.

Examples of the determination of an input variable based on an environmental characteristic value include: simply copying the environmental characteristic value into the input variable, applying a mathematical formula for calculating the input variable based on the environmental characteristic value, etc. An input variable may also by determined based on more than one environmental characteristic value.

Optionally, one or more of the input variables is determined based on a set point provided by a user 10 illustrated in FIG. 1. The user 10 provides at least one set point to the environment controller 100. Examples of set points include target environmental characteristic values, such as a target temperature, a target humidity level, a target $CO_2$ level, a combination thereof, etc. These examples are for illustration purposes only, and a person skilled in the art would readily understand that other types of set points could be used in the context of an environment control system managed by the environment controller 100. Furthermore, each set point may consist of either a single value (e.g. target temperature of 25 degrees Celsius), or a range of values (e.g. target temperature from 25 to 26 degrees Celsius).

The user 10 enters the set point(s) via the user interface 140 of the environment controller 100. Alternatively, the user 10 enters the set point(s) via a user interface of a computing device (e.g. a smartphone, a tablet, etc.) not represented in FIG. 1 for simplification purposes; and the set point(s) is (are) transmitted over a communication network and received via the communication interface 130 of the environment controller 100.

Examples of the determination of an input variable based on a set point include: simply copying the set point into the input variable, applying a mathematical formula for calculating the input variable based on the set point, etc. An input variable may also by determined based on more than one set point.

Optionally, one or more of the input variables is determined based on a characteristic of an area (e.g. room, aisle, floor, etc.) of a building. The environment controller 100, the sensors 200 and the controlled appliance 300 are deployed in the building; but are not necessarily all located in the same area of the building. Area characteristics include one or more geometric characteristic of the area. Examples of geometric characteristics include a volume of the area, a surface of the area, a height of the area, a length of the area, a width of the area, etc. Instead of a given value, the geometric characteristics may be identified as ranges of values. For example, the volume of the area is defined by the following ranges of values: 0 to 50 cubic meters, 50 to 200 cubic meters, and more than 200 cubic meters. Similarly, the height of the area is defined by the following ranges of values: less than 3 meters and more than 3 meters.

Alternatively or complementarity, the characteristics of a current area include an area type identifier of the current area. A plurality of area type identifiers is defined, each area type identifier corresponding to areas having one or more geometric characteristic in common. For example, each area type identifier is an alphanumerical value. The area type identifier of the current area is selected among the plurality of pre-defined area type identifiers based on geometric characteristics of the current area. For instance, the area type identifier R1 is allocated to areas having a volume lower than 50 cubic meters; the area type identifier R2 is allocated to areas having a volume between 50 and 200 cubic meters, and a height lower than 3 meters; the area type identifier R3 is allocated to areas having a volume between 50 and 200 cubic meters, and a height higher than 3 meters; and the area type identifier R4 is allocated to areas having a volume higher than 200 cubic meters.

Alternatively or complementarity, the characteristics of a current area include a human activity in the area. For example, the human activity in the area comprises periods of time when the area is occupied by humans (e.g. during the day or during the night, in the morning or in the afternoon, during the week or the week end, etc.). Alternatively or complementarity, the human activity in the area defines the type of activity performed by the persons occupying the area. For instance, the area is an office room, a room in a store, a storage room, a workshop room, a room in a house or an apartment, etc.

The aforementioned area type identifier of the area can also be based on the human activity in the area. Furthermore, a person skilled in the art would readily understand that other types of area characteristics could be used in the context of an environment control system managed by the environment controller 100.

Each one of the characteristics of an area can be transmitted to the environment controller 100 by another computing device (not represented in FIGS. 1 and 2 for simplification purposes) via the communication interface 130, transmitted by a user 10 via the user interface 140, determined autonomously by the environment controller 100, determined by the environment controller 100 based on data transmitted to the environment controller 100, etc.

Examples of the determination of an input variable based on an area characteristic include: simply copying the area characteristic into the input variable, applying a mathematical formula for calculating the input variable based on the area characteristic, etc. An input variable may also by determined based on more than one area characteristic.

FIG. 3 illustrates the third input variable being based on one of the following: a set point, an area characteristic, and an internal state. An internal state is for example an environmental state previously determined by the environment control software 112 and used during the current iteration of the method 500.

An input variable may also be determined based on a combination of at least two among an environment characteristic value, a set point, an area characteristic and an internal state. However, this type of combination is more complex and is preferably performed by the environment control software module 112' during step 515 of the method 500. Thus, in the general case, an input variable is determined based solely on a single type of data selected among the environment characteristic values, the set points, the area characteristics and the internal states.

The method 500 comprises the step 515 of calculating at least one output variable based on the plurality of input variables determined at step 515. This step is performed by the environment control software 112 executed by the processing unit 110. More specifically, this step is performed by the environment control software module 112' as illustrated in FIG. 3. As mentioned previously, the environment control software module 112' is a software module of the environment control software 112.

A single output variable is represented in FIG. 3 for illustration purposes only, but the environment control software module 112' may generate any number of output variable based on the input variables. The calculation of the output variable(s) by the environment control software module 112' uses a mathematical formula, an algorithm, a rule engine, a combination thereof, etc.; as is well known in the art.

The environment control software 112 may include a plurality of environment control software module 112' (not represented in the Figures for simplification purposes) for calculation output variable(s) based on a plurality of input variables. The output variable (e.g. an environmental state) of an environment control software module 112' can be used as input variable of the same environment control software module 112', or as input variable of another environment control software module 112'.

The method 500 comprises the step 520 of generating one or more command for controlling the controlled appliance 300 based on one or more of the output variable(s) calculated at step 515. This step is performed by the environment control software 112 executed by the processing unit 110.

FIG. 3 represents a single output variable being used for generating a single command for illustration purposes only. However, a given command may be generated based on a plurality of output variables generated by the environment control software module 112'. Furthermore, the output variables of the environment control software module 112' may be used for generating a plurality of commands. The plurality of commands may be used to control a plurality of controlled appliances 300 or a single control appliance 300.

The method 500 comprises the step 525 of transmitting the command(s) to the controlled appliance 300 via the communication interface 130. This step is performed by the environment control software 112 executed by the processing unit 110.

Figure 6:
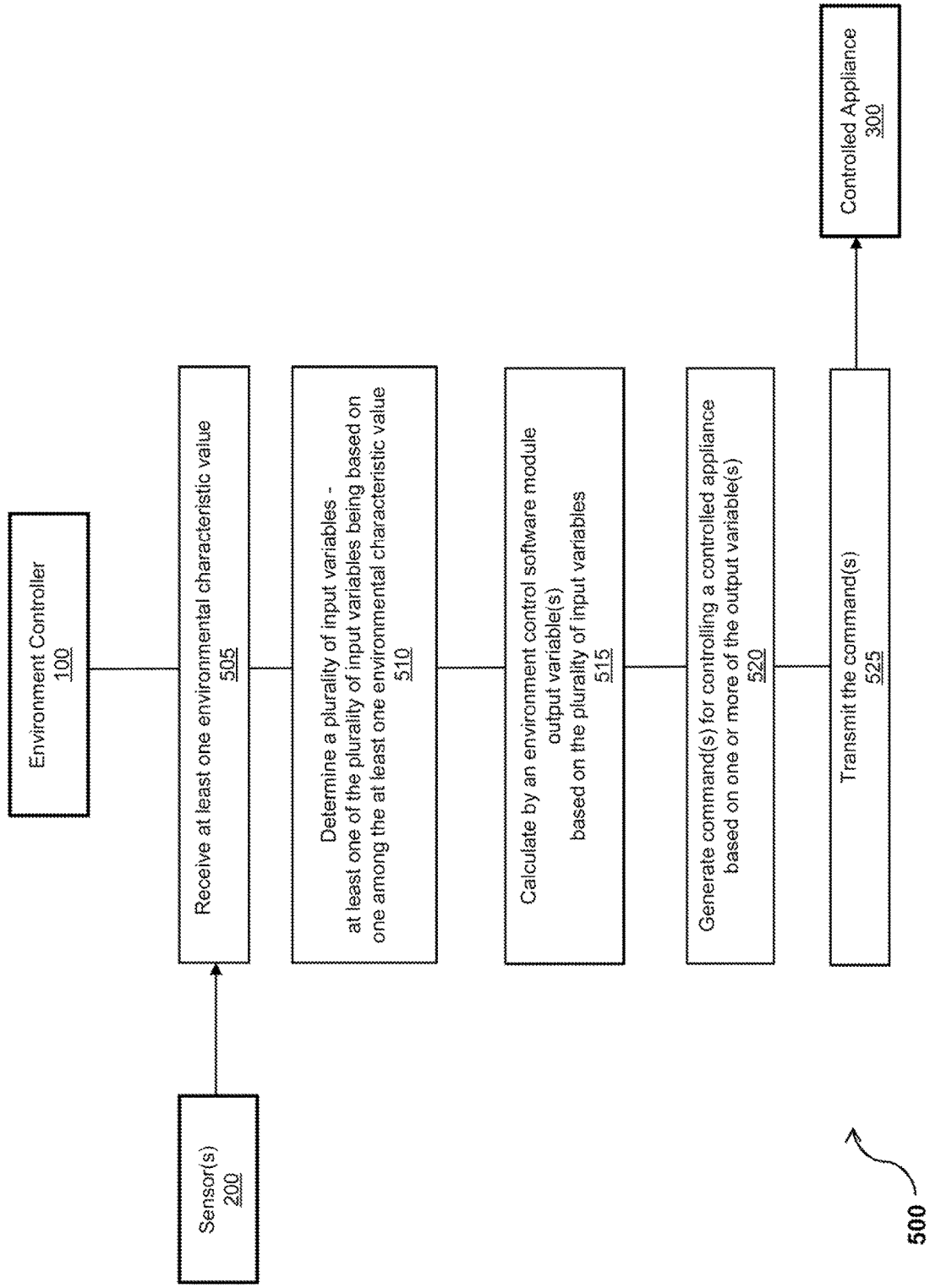
FIG. 6 illustrates an environment control method executed by the environment controller of FIG. 1.

Although not represented in FIG. 6 for simplification purposes, the method 500 comprises the additional step of applying the command(s) by the controlled appliance 300.

Steps 510 to 525 are repeated if a new environmental characteristic value is received at step 505. Furthermore, configurable thresholds can be used for each type of environmental characteristic value received at step 505, so that a change in the value of an environmental characteristic value is not taken into consideration as long as it remains within the boundaries of the corresponding threshold(s). For example, if the environmental characteristic value is a new current temperature received at step 505, the threshold can be an increment/decrease of 1 degree Celsius in the current temperature.

Environment Controller Interfaced with AI Means—Operational Phase

Figure 4:
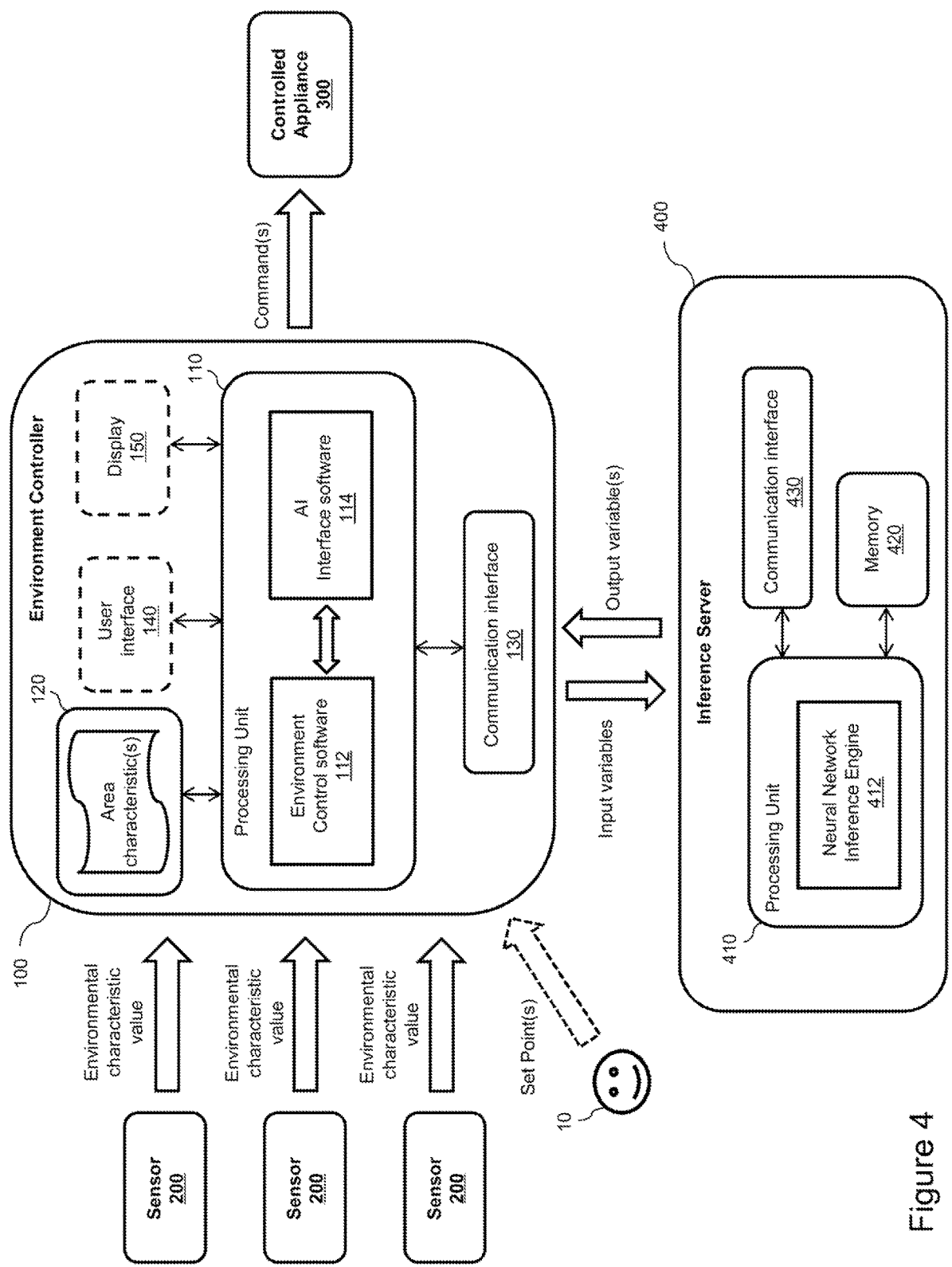
FIG. 4 illustrates the environment controller of FIG. 1 adapted for interacting with an inference server for bypassing the legacy environment control software module of FIG. 3.

Referring now concurrently to FIGS. 4, 5A, 5B, 5C, 6 and 7, the environment controller 100 represented in FIG. 1 has been adapted as illustrated in FIG. 4 for executing a method 600 (represented in FIG. 7) for bypassing the environment control software module 112' represented in FIG. 3.

In this part of the description, the environment control software module 112' is referred to as the legacy environment control software module 112'. The term legacy refers to the fact that the environment control software module 112' was initially deployed on the environment controller 100 for calculating output variable(s) based on a plurality of input variables according to the legacy method 500. However, new AI means (more specifically means using a neural network) have been added to the environment controller 100 for determining the output variable(s) based on the plurality of input variables according to the new method 600. A user of the environment controller 100 has the possibility to configure the environment controller 100 to use either one of the legacy environment control software module 112' (legacy method 500) or the new AI means (new method 600).

The processing unit 110 of the environment controller 100 executes the environment control software 112, which comprises the legacy environment control software module 112'. As mentioned previously, the legacy environment control software module 112' has not been modified.

The processing unit 110 further executes the AI interface software 114, which provides an interface to an inference server 400 via the communication interface 130 of the environment controller 100. The AI interface software 114 comprises an AI control software module 114' which will be detailed in the description of the method 600. The AI interface software 114 may include a single AI control software module 114', a plurality of AI control software modules 114', and additional software modules.

The inference server 400 comprises a processing unit 410, memory 420 and a communication interface 430. The processing unit 410 of the inference server 400 executes a neural network inference engine 412. A predictive model is used by the neural network inference engine 412 for inferring output(s) based on inputs, as is well known in the art of neural networks. The predictive model is stored in the memory 420.

The predictive model is generated by a training server (not represented in FIG. 4 for simplification purposes) executing a neural network training engine (not represented in FIG. 4 for simplification purposes). The training model is transmitted by the training server to the inference server 400; and received via the communication interface 430 for storage in the memory 420. Alternatively, the training server is also executed by the inference server 400 during a training phase for generating the predictive model. The generated predictive model is then directly stored in the memory 420, for usage during an operational phase by the neural network inference engine 412.

The inference server 400 and the environment controller 100 exchange data via their respective communication interfaces 430 and 130 over a communication network. The environment controller 100 transmits input variables to the inference server 400 and the inference server 400 transmits inferred output variable(s) to the environment controller 100, as will be detailed in the description of the method 600.

At least some of the steps of the method 600 are implemented by the environment controller 100, to bypass the legacy environment control software module 112'.

A dedicated computer program has instructions for implementing the steps of the method 600 executed by the environment controller 100. The instructions are comprised in a non-transitory computer program product (e.g. the memory 120) of the environment controller 100. The instructions, when executed by the processing unit 110 of the environment controller 100, provide for bypassing the legacy environment control software module 112'. The instructions are deliverable to the environment controller 100 via an electronically-readable media such as a storage media (e.g. CD-ROM, USB key, etc.), or via communication links (e.g. via a communication network through the communication interface 130).

The dedicated computer program having instructions for implementing the steps of the method 600 comprises at least a portion of the environment control software 112 and at least a portion of the AI interface software 114 (in particular the AI control software module 114').

The method 600 comprises the step 605 of receiving at least one environmental characteristic value via the communication interface 130. This step is performed by the environment control software 112 executed by the processing unit 110 of the environment controller 100. The environmental characteristic values are received from the sensors 200. This step is similar to step 505 of the method 500.

The method 600 comprises the step 610 of determining a plurality of input variables. At least one of the plurality of input variables is based on one among the at least one environmental characteristic value determined at step 605. This step is performed by the environment control software 112 executed by the processing unit 110. This step is similar to step 510 of the method 500. As mentioned previously with reference to the method 500, an input variable can also be based on set point(s), area characteristic(s), internal state(s), etc.

Figure 5A:
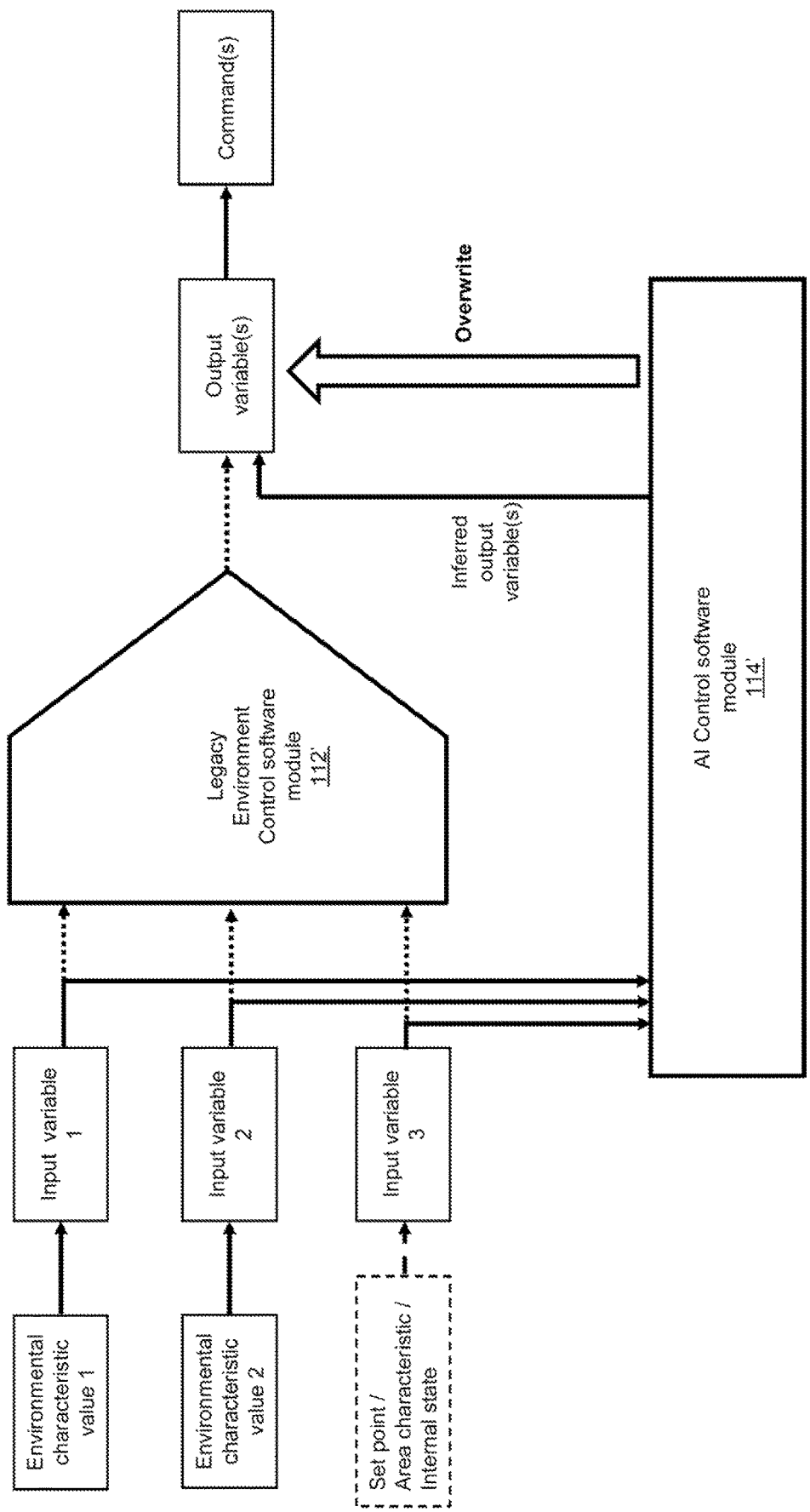
FIGS. 5A, 5B and 5C illustrate an Artificial Intelligence (AI) control software module executed by the environment controller of FIG. 4.
Figure 5B:
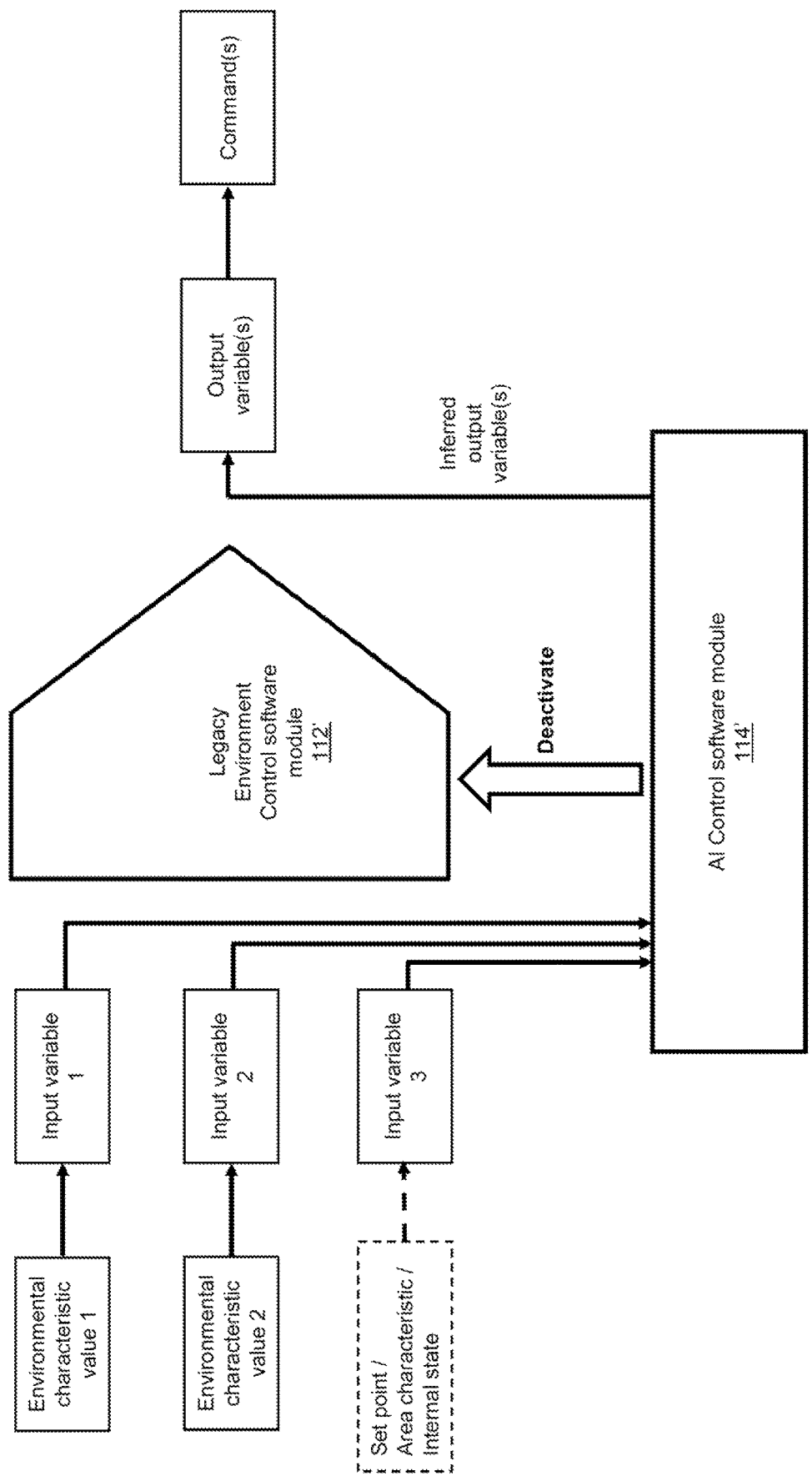
Figure 5C:
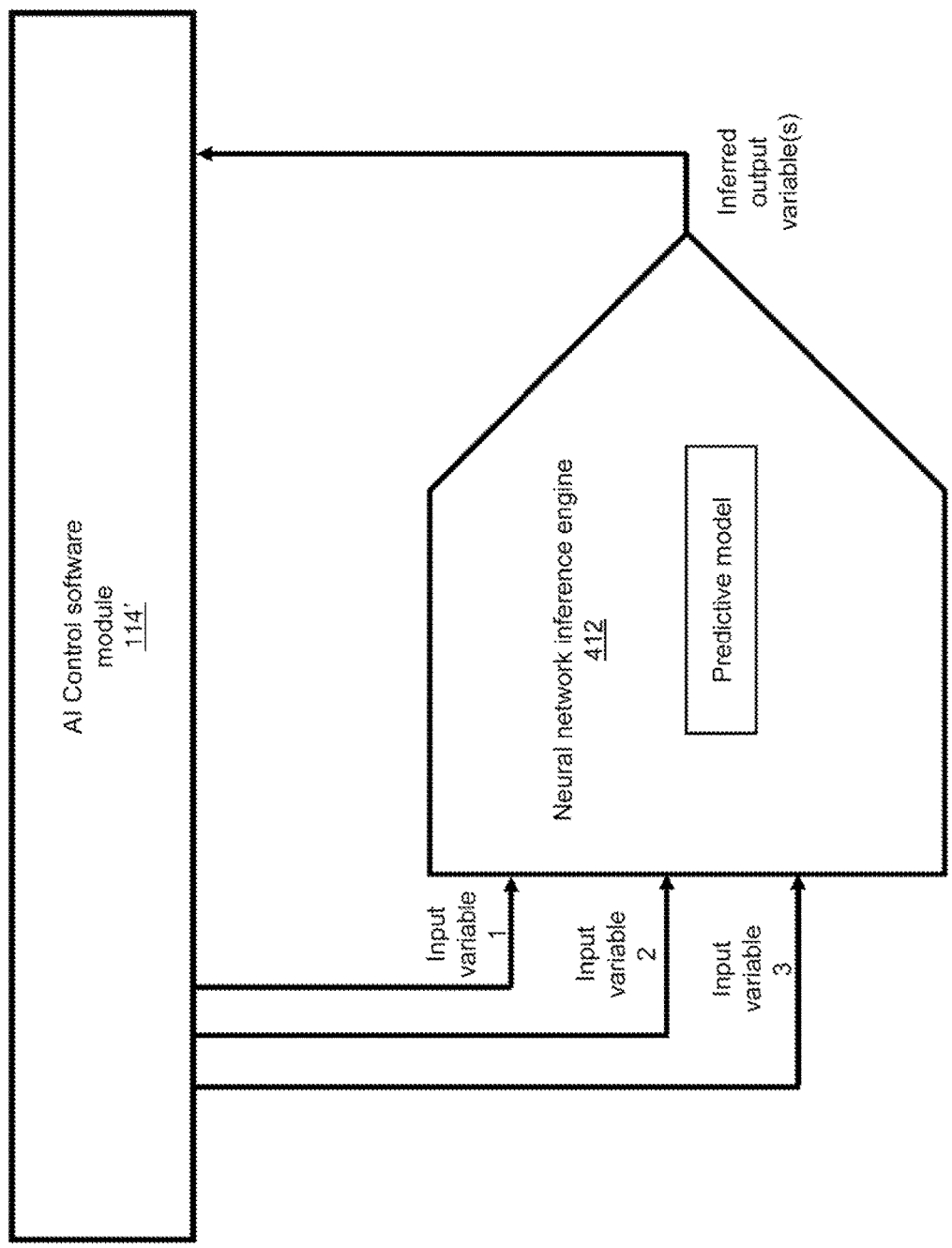

The method 600 comprises the step 615 of transmitting the plurality of input variables (determined at step 610) to the inference server 400 via the communication interface 130. This step is performed by the AI control software module 114' executed by the processing unit 110. This step is illustrated in FIGS. 5A and 5C in a first implementation; and in FIGS. 5B and 5C in a second implementation. These two alternative implementations will be detailed later in the description of the method 600.

The method 600 comprises the step 620 of receiving the plurality of input variables (determined at step 610) at the inference server 400 via the communication interface 430 of the inference server 400. This step is performed by the processing unit 410 of the inference server 400.

The method 600 comprises the step 625 of executing the neural network inference engine 412 using the predictive model stored in the memory 420 of the inference server 400 for generating at least one inferred output variable based on the plurality of input variables received at step 620. This step is performed by the processing unit 410 of the inference server 400. This step is illustrated in FIG. 5C.

The method 600 comprises the step 630 of transmitting the inferred output variable(s) (inferred at step 625) to the environment controller 100 via the communication interface 430. This step is performed by the processing unit 410 of the inference server 400. This step is illustrated in FIG. 5C.

The method 600 comprises the step 635 of receiving the inferred output variable(s) (inferred at step 625) at the environment controller 100 via the communication interface 130. This step is performed by the AI control software module 114' executed by the processing unit 110. This step is illustrated in FIG. 5C.

The method 600 comprises the step 640 of using the at least one inferred output variable received from the inference server 400 by the AI control software module 114', in place of the at least one output variable calculated by the legacy environment control software module 112' based on the plurality of input variables. This step is performed by the environment control software module 112' executed by the processing unit 110. This step corresponds to steps 520 and 525 of the method 500. For example, as illustrated in FIGS. 5A and 5B, one or more commands for controlling the appliance 300 are generated based on one or more of the inferred output variable(s). Thus, the one or more commands are based on output(s) of the neural network inference engine 412 executed by the inference server 400 instead of being based on output(s) of the legacy environment control software module 112'.

FIGS. 5A and 5B illustrate two alternative mechanisms for implementing the method 600. These alternative mechanisms are performed by the AI control software module 114' executed by the processing unit 110. The AI control software module 114' is designed to implement only of the two alternative mechanisms. Alternatively, the AI control software module 114' is designed to implement both of the two alternative mechanisms; and is configured to execute one of the two. These two alternative mechanisms have not been represented in FIG. 7 for simplification purposes. The following paragraphs describe how the two alternative mechanisms integrate with the steps of the method 600.

A first mechanism represented in FIG. 5A consists in executing the legacy environment control software module 112' and overwriting the at least one output variable calculated by the legacy environment control software module 112' with the at least one inferred output variable received from the inference server 400 by the AI control software module 114'.

The execution of the legacy environment control software module 112' for calculating the at least one output variable based on the plurality of input variables is performed in parallel to steps 615 to 635 of the method 600. The overwriting of the at least one calculated output variable (calculated by the legacy environment control software module 112') with the at least one inferred output variable (received from the inference server 400 by the AI control software module 114') is performed after step 635 and before step 640.

A person skilled in the art of software programming would readily understand how to implement this overwriting mechanism. In particular, the implementation shall guarantee that the legacy environment control software module 112' calculates the output variable(s) before the AI control software module 114' overwrites them with the inferred output variable(s).

A second mechanism represented in FIG. 5B consists in preventing the execution of the legacy environment control software module 112'. The AI control software module 114' deactivates the legacy environment control software module 112'. Thus, the legacy environment control software module 112' does not calculate the at least one output variable based on the plurality of input variables. The environment control software module 112' simply uses the at least one inferred output variable (received from the inference server 400 by the AI control software module 114') in place of the at least one calculated output variable (calculated by the legacy environment control software module 112'), as per step 640 of the method 600.

A person skilled in the art of software programming would readily understand how to implement this deactivation mechanism. In particular, the implementation shall guarantee that the timing for deactivating the legacy environment control software module 112' is appropriate (e.g. before or just after step 610).

Furthermore, one way to implement the two aforementioned mechanisms is to allocate dedicated memory spaces in the memory 120 for storing the output variables. The environment control software 112 reads these dedicated memory spaces to retrieve the output variables and perform steps 520 and 525 (generate commands and transmit the generated commands). The legacy environment control software module 112' copies the calculated output variable(s) into the relevant dedicated memory space(s). Similarly, the AI control software module 114' copies the inferred output variable(s) into the relevant dedicated memory space(s); which results in overwriting the calculated values in the case of the first mechanism.

From an implementation perspective, the environment control software 112 needs to be slightly adapted to interface with the new AI interface software 114, but the legacy environment control software module 112' does not need to be modified. Thus, the present disclosure provides means for enhancing the functionalities of the environment controller 100 with AI capabilities without requiring a costly and complicated evolution of the software executed by the environment controller 100. In particular, if the environment controller 100 comprises a plurality of legacy environment control software module 112' for calculating a plurality of commands controlling various types of controlled appliances 300, this plurality of legacy environment control software module 112' do not need to be modified. Additionally, the environment controller 100 can be configured (e.g. by a user via the user interface 140) to use either one of the legacy environment control software module 112' or the new AI functionality, based on specific needs.

If the environment controller 100 comprises a plurality of legacy environment control software module 112', the inference server 400 stores a corresponding plurality of predictive models in the memory 420. Upon execution of the method 600 for bypassing one among the plurality of legacy environment control software module 112', the neural network inference engine 412 uses the predictive model corresponding to the one among the plurality legacy environment control software module 112'.

Figure 8:
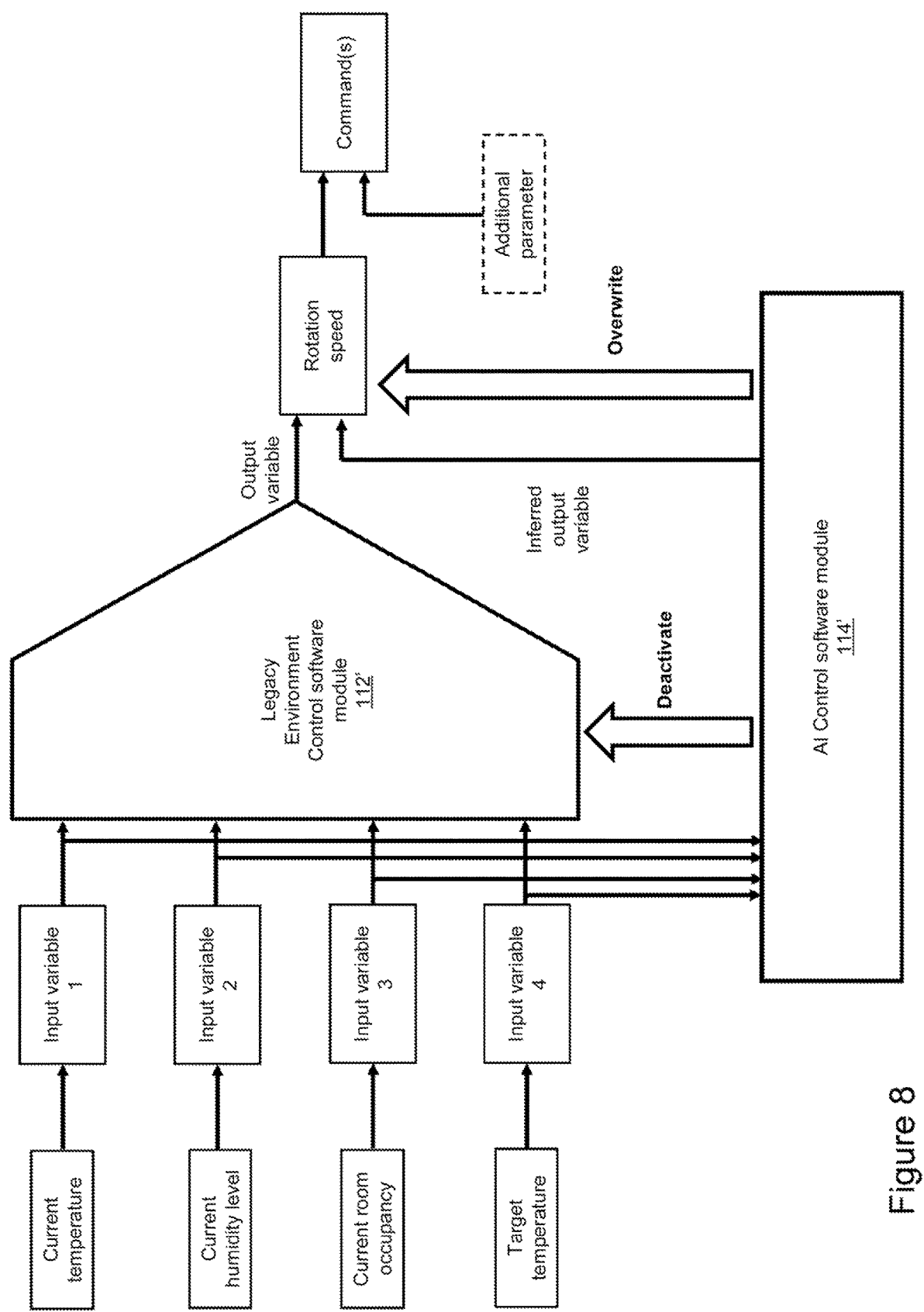
FIG. 8 illustrates the usage of the AI control software module of FIGS. 5A-C for an exemplary use case.

Referring now concurrently to FIGS. 2, 4 and 8, an exemplary use case is illustrated.

The legacy environment control software module 112' has four input variables. The first input variable is based on a current temperature received from a temperature sensor 200. The second input variable is based on a current humidity level received from a humidity sensor 200. The third input variable is based on a current room occupancy received from an occupancy sensor 200. The fourth input variable is based on a target temperature received from a user 10 via the user interface 140.

The output variable calculated by the legacy environment control software module 112' based on the four input variables is the calculated rotation speed of a fan. The inferred output variable generated by the neural network inference engine 412 based on the four input variables is the inferred rotation speed of the fan (inferred via the predictive model stored in the memory 420 of the inference server 400).

A command comprising the rotation speed as a parameter is generated by the environment control software 112. The command is transmitted to the controlled appliance 300 for adjusting the rotation speed of a fan of the controlled appliance 300. The generation of the command may take into account additional parameter(s).

Reference is now made concurrently to FIGS. 4 and 5C.

A proprietary communication protocol may be used for exchanging data between the inference server 400 and the environment controller 100. Although not represented in FIG. 4 for simplification purposes, the inference server 400 may exchange data with a plurality of environment controllers 100, as will be illustrated later in the description in relation to FIG. 9. Alternatively, the inference server 400 executes a web server and each environment controller 100 executes a web client. The exchange of data is based on the Hypertext Transfer Protocol (HTTP) or Hypertext Transfer Protocol Secure (HTTPS) protocol, as is well known in the art.

Alternative AI technologies may be used in place of a neural network. The processing unit 410 of the inference server 400 executes an engine supporting the alternative AI technology in place of the neural network inference engine 412.

In an alternative implementation, the neural network inference engine 412 is executed directly by the processing unit 110 of the environment controller 100. The data exchanged between the AI control software module 114' and the inference engine 412 are internal to the environment controller 100. There is no data exchanged with an inference server 400. The predictive model is stored in the memory 120 of the environment controller 100. This alternative implementation is only possible if the processing power of the processing unit 110 and the memory capacity of the memory 120 are sufficient for supporting the execution of the neural network inference engine 412.

The present disclosure aims at replacing a static technology (the legacy environment control software module 112') by a more dynamic technology (the neural network inference engine 412). The legacy environment control software module 112' is not capable of dealing with a situation (e.g. unexpected values of the input variables) that was not anticipated during the design of the legacy environment control software module 112'. By contrast, the neural network inference engine 412 may still be capable of generating relevant output variable(s) when presented with unexpected values of the input variables.

The robustness of the neural network inference engine 412 depends on the robustness of the predictive model, which is generated during a training phase. During the training phase, a neural network training engine uses a plurality of samples for generating the predictive model. Each sample comprises a given set of input variables and corresponding expected output(s). As is well known in the art of neural networks, during the training phase, the neural network implemented by the neural network training engine adjusts its weights. Furthermore, during the training phase, the number of layers of the neural network and the number of nodes per layer can be adjusted to improve the accuracy of the model. At the end of the training phase, the predictive model generated by the neural network training engine includes the number of layers, the number of nodes per layer, and the weights. The inputs and outputs for the training phase of the neural network can be collected through an experimental process, by collecting data from environment controllers 100 operating in real life conditions.

The neural network training engine has not been represented in the Figures for simplification purposes. The neural network training engine can be executed by the processing unit 410 of the inference server 400. Alternatively, the neural network training engine is executed on a standalone training server; and the generated predictive model is transmitted to the inference server 400.

Following is an example of training data. A first input variable is the current temperature in a room, a second input variable is the current room occupancy, and a third input variable is the target temperature in the room. The output variable is the operating speed of a fan of the controlled appliance 300. The following speeds are available: 5, 10, 15, 20 and 25 revolutions per second.

The neural network training engine is fed with the following combinations of data: [current temperature 30, room occupied by 0 person, target temperature 22, fan speed 15], [current temperature 30, room occupied by 2 persons, target temperature 22, fan speed 20], [current temperature 30, room occupied by 4 persons, target temperature 22, fan speed 25], [current temperature 24, room occupied by 0 person, target temperature 22, fan speed 5], [current temperature 24, room occupied by 2 persons, target temperature 22, fan speed 10], [current temperature 24, room occupied by 4 persons, target temperature 22, fan speed 15], etc.

Various techniques well known in the art of neural networks are used for performing (and improving) the generation of the predictive model, such as forward and backward propagation, usage of bias in addition to the weights (bias and weights are generally collectively referred to as weights in the neural network terminology), reinforcement training, etc.

During the operational phase where the method 600 is executed, the neural network inference engine 412 uses the predictive model (e.g. the values of the weights) determined during the training phase, to infer (at step 625 of the method 600) output variable(s) based on the plurality of input variables, as is well known in the art of neural networks.

Figure 7:
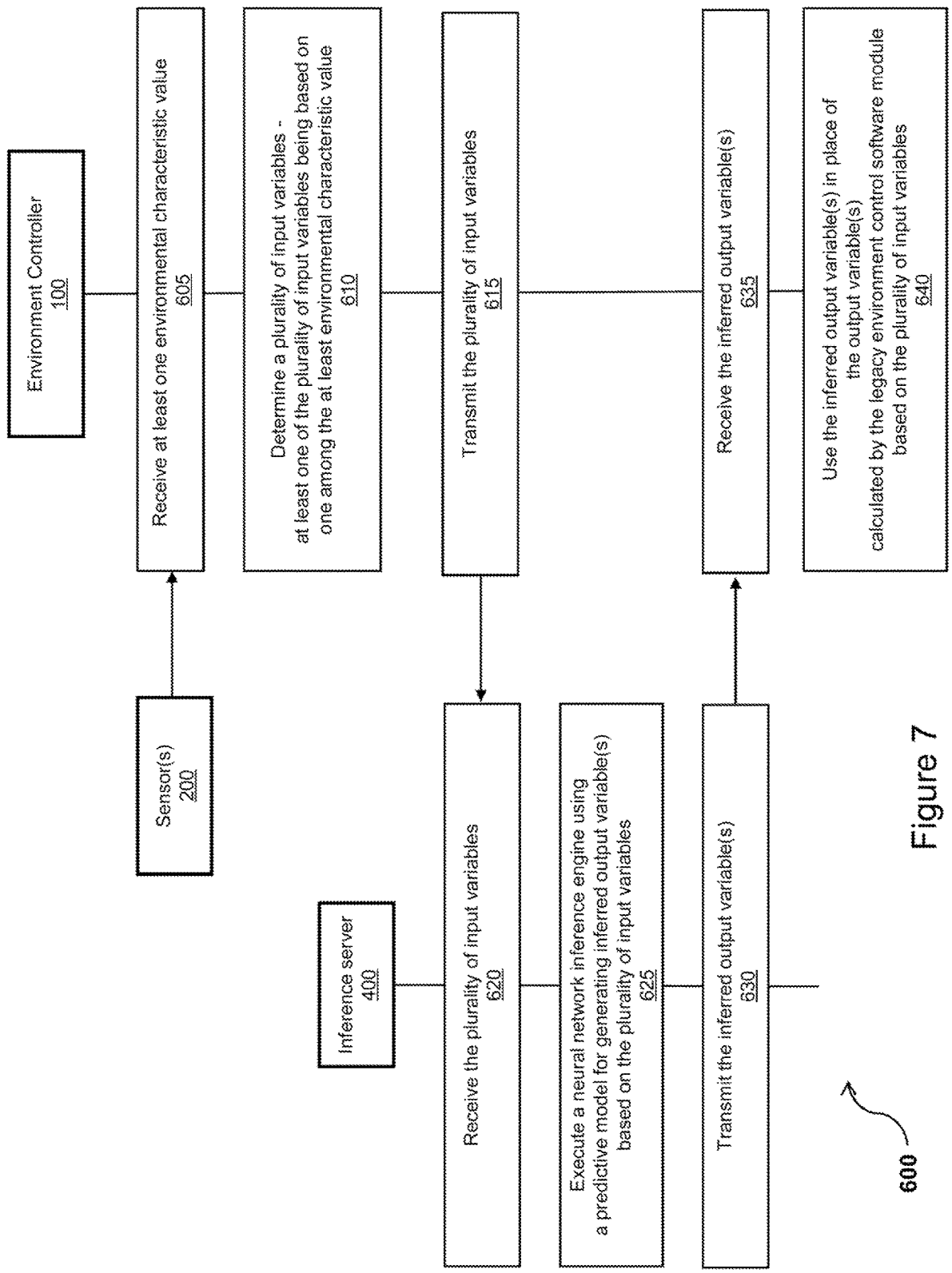
FIG. 7 illustrates a method executed by the environment controller of FIG. 4 for bypassing the legacy environment control software module of FIG. 3.
Figure 9:
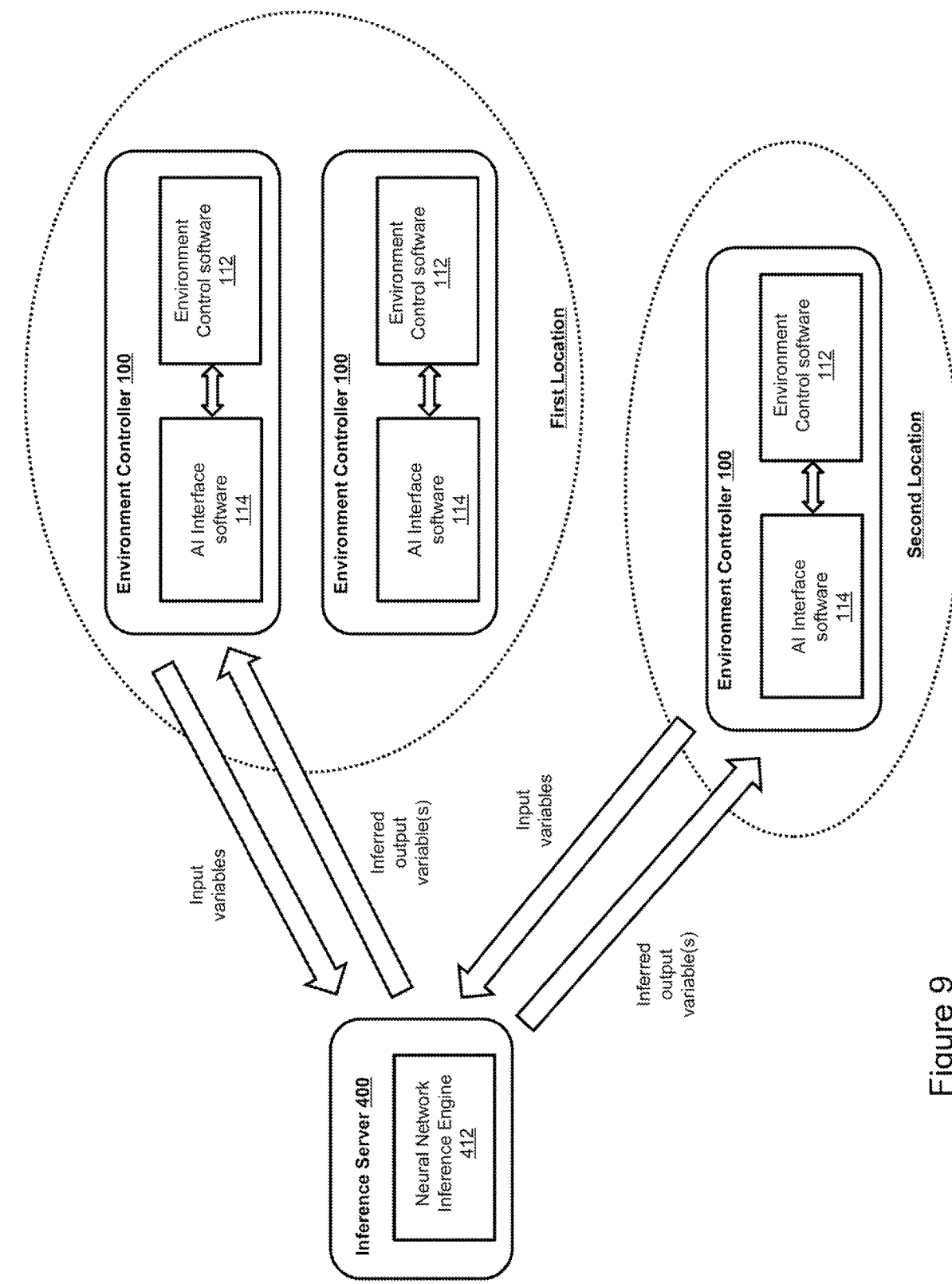
FIG. 9 represents an environment control system where a plurality of environment controllers of FIG. 4 implementing the method of FIG. 7 are deployed.

Reference is now made concurrently to FIGS. 4, 7 and 9, where FIG. 9 illustrates the usage of the method 600 in a large environment control system.

A first plurality of environment controllers 100 implementing the method 600 are deployed at a first location. Only two environment controllers 100 are represented for illustration purposes, but any number of environment controllers 100 may be deployed.

A second plurality of environment controllers 100 implementing the method 600 are deployed at a second location. Only one environment controller 100 is represented for illustration purposes, but any number of environment controllers 100 may be deployed.

The first and second locations may consist of different buildings, different floors of the same building, etc. Only two locations are represented for illustration purposes, but any number of locations may be considered.

The environment controllers 100 correspond to the environment controllers represented in FIG. 4. Each environment controller 100 represented in FIG. 9 interacts with at least one sensor 200 and at least one controlled appliance 300, as illustrated in FIG. 4.

Each environment controller 100 executes both the environment control software 112 and the AI interface software 114. Each environment controller 100 transmits a plurality of input variables to the inference server 400. Each environment controller 100 receives in response one or more inferred output variable from the inference server 400. The inferred output variables are used by the environment controllers 100 for generating commands for controlling the controlled appliances 300.

For instance, a cloud-based inference server 400 is in communication with the environment controllers 100 via a networking infrastructure, as is well known in the art. The inference server 400 executes the neural network inference engine 412 which uses a predictive model. The same predictive model is used by the neural network inference engine 412 for all the environment controllers 100. Alternatively, a plurality of predictive models is used, taking into account specific operating conditions of the environment controllers 100. For example, a first predictive model is used for the environment controllers 100 controlling a first type of appliance 300, and a second predictive model is used for the environment controllers 100 controlling a second type of appliance 300.

The exchange of data between the environment controllers 100 and the inference server 400 rely on an Internet Protocol (IP) based networking infrastructure. Exemplary IP based protocols for exchanging the data include the Building Automation and Control networks (BACnet) protocol, HTTP web services compliant with the Representational State Transfer (REST), etc.

FIG. 9 illustrates a centralized architecture, where the environment controllers 100 do not take autonomous decisions for determining the command(s) used for controlling the appliances 300, but generate commands based on the inferred output variables received from the centralized inference server 400.

Environment Controller Interfaced with AI Means—Training Phase

Figure 10:
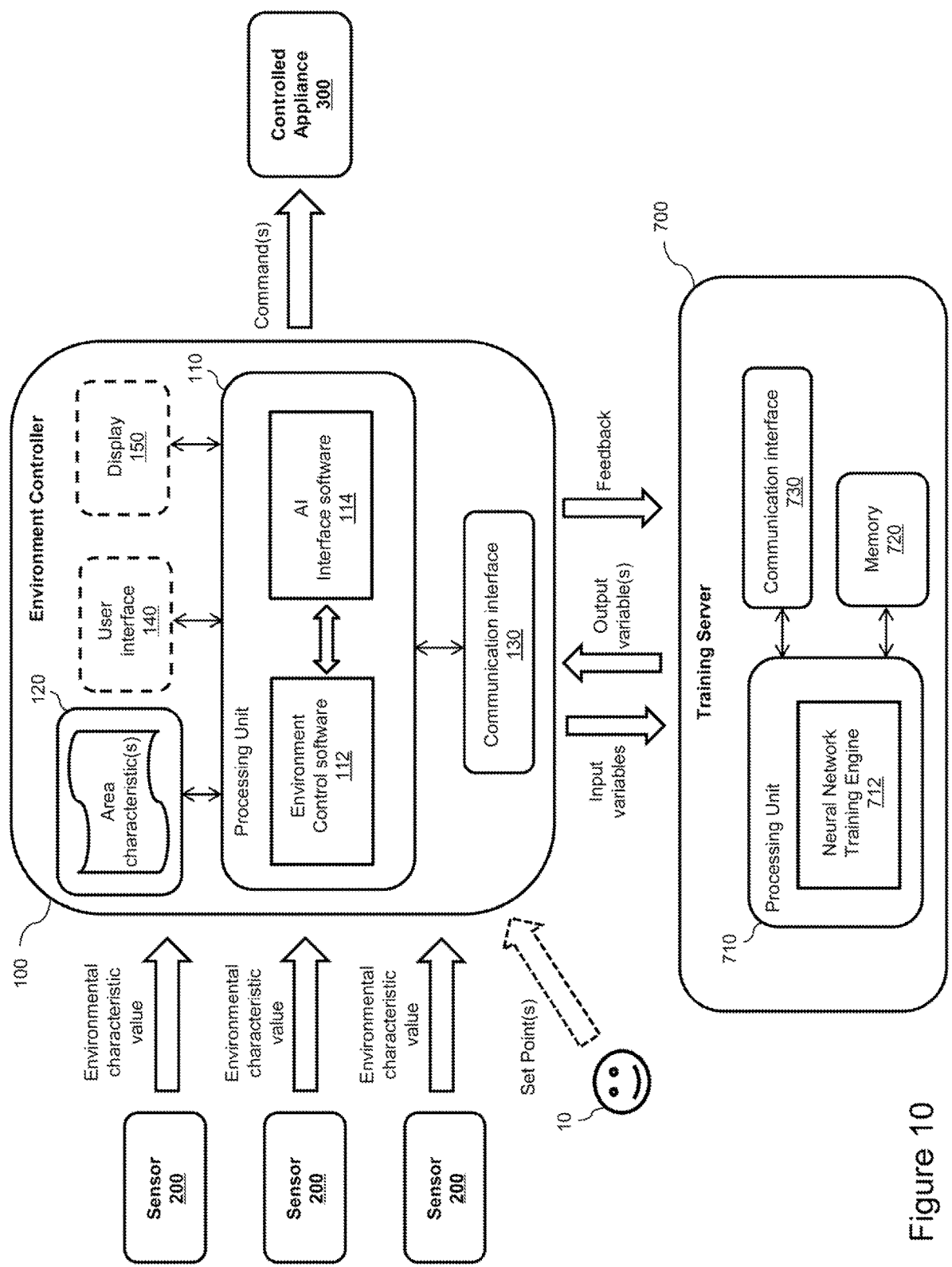
FIG. 10 illustrates the environment controller of FIG. 1 adapted for interacting with a training server for validating a predictive model used by a neural network at the training server.

Referring now concurrently to FIGS. 10, 11A, 11B, 12A and 12B, the environment controller 100 represented in FIG. 4 has been adapted as illustrated in FIG. 10 for executing a method 800 (represented in FIGS. 12A and 12B) for validating a neural network.

In this part of the description, the environment control software module 112' is no longer referred to as the legacy environment control software module 112'. The main function of the environment control software module 112' is to calculate output variable(s) based on a plurality of input variables according to the method 500 illustrated in FIG. 6. A second function of the environment control software module 112' is to provide data for validating a predictive model of a neural network. A user of the environment controller 100 has the possibility to configure the environment controller 100 to activate or not this second function.

The environment controller 100 represented in FIG. 10 is similar to the environment controller 100 represented in FIG. 4, except for the AI interface software 114. The AI interface software 114 comprises an AI validation software module 114" represented in FIGS. 11A and 11B instead of the AI control software module 114' represented in FIGS. 5A, 5B and 5C The processing unit 110 of the environment controller 100 executes the AI interface software 114, which provides an interface to a training server 700 via the communication interface 130 of the environment controller 100. The AI interface software 114 comprises the AI validation software module 114" which will be detailed in the description of the method 800. The AI interface software 114 may include a single AI validation software module 114", a plurality of AI validation software modules 114", and additional software modules.

The training server 700 is similar to the inference server 400 of FIG. 4, except for the execution of a neural network training engine 712 instead of the neural network inference engine 412 of FIG. 4. The processing unit 710 of the inference server 700 executes the neural network training engine 712. A predictive model is used by the neural network training engine 412 for inferring output(s) based on inputs, as is well known in the art of neural networks. The predictive model is stored in the memory 720.

The predictive model has been generated by the training server 700 in an initial phase using a set of training samples, as is well known in the art of neural networks. The current phase consists in validating the predictive model using a set of testing samples. It is considered a good practice by persons skilled in the art to train the neural network (generate the predictive model) with a set of training samples, and to validate the neural network (validate the generated predictive model) with a set of testing samples different from the set of training samples. In addition to the validation, the predictive model can be adapted to improve its accuracy, based on the results of the validation.

The training server 700 and the environment controller 100 exchange data via their respective communication interfaces 730 and 130 over a communication network. The environment controller 100 transmits input variables to the training server 700, the training server 700 transmits inferred output variable(s) to the environment controller 100 and the environment controller 100 transmits feedback data to the training server 700, as will be detailed in the description of the method 800.

A single server can be used for implementing the inference server 400 of FIG. 4 and the training server 700 of FIG. 10. The single server executes a neural network, capable of implementing the neural network inference engine functionality 412 of FIG. 4 and the neural network training engine functionality 712 of FIG. 10.

At least some of the steps of the method 800 are implemented by the environment controller 100, to validate the predictive model generated by the neural network training engine 712.

A dedicated computer program has instructions for implementing the steps of the method 800 executed by the environment controller 100. The instructions are comprised in a non-transitory computer program product (e.g. the memory 120) of the environment controller 100. The instructions, when executed by the processing unit 110 of the environment controller 100, provide for validating the predictive model generated by the neural network training engine 712. The instructions are deliverable to the environment controller 100 via an electronically-readable media such as a storage media (e.g. CD-ROM, USB key, etc.), or via communication links (e.g. via a communication network through the communication interface 130).

The dedicated computer program having instructions for implementing the steps of the method 800 comprises at least a portion of the environment control software 112 and at least a portion of the AI interface software 114 (in particular the AI validation software module 114").

The method 800 comprises the step 805 of receiving at least one environmental characteristic value via the communication interface 130. This step is performed by the environment control software 112 executed by the processing unit 110 of the environment controller 100. The environmental characteristic values are received from the sensors 200. This step is similar to step 605 of the method 600.

The method 800 comprises the step 810 of determining a plurality of input variables. At least one of the plurality of input variables is based on one among the at least one environmental characteristic value determined at step 805. This step is performed by the environment control software 112 executed by the processing unit 110. This step is similar to step 610 of the method 600. As mentioned previously with reference to the method 500, an input variable can also be based on set point(s), area characteristic(s), internal state(s), etc.

Figure 11A:
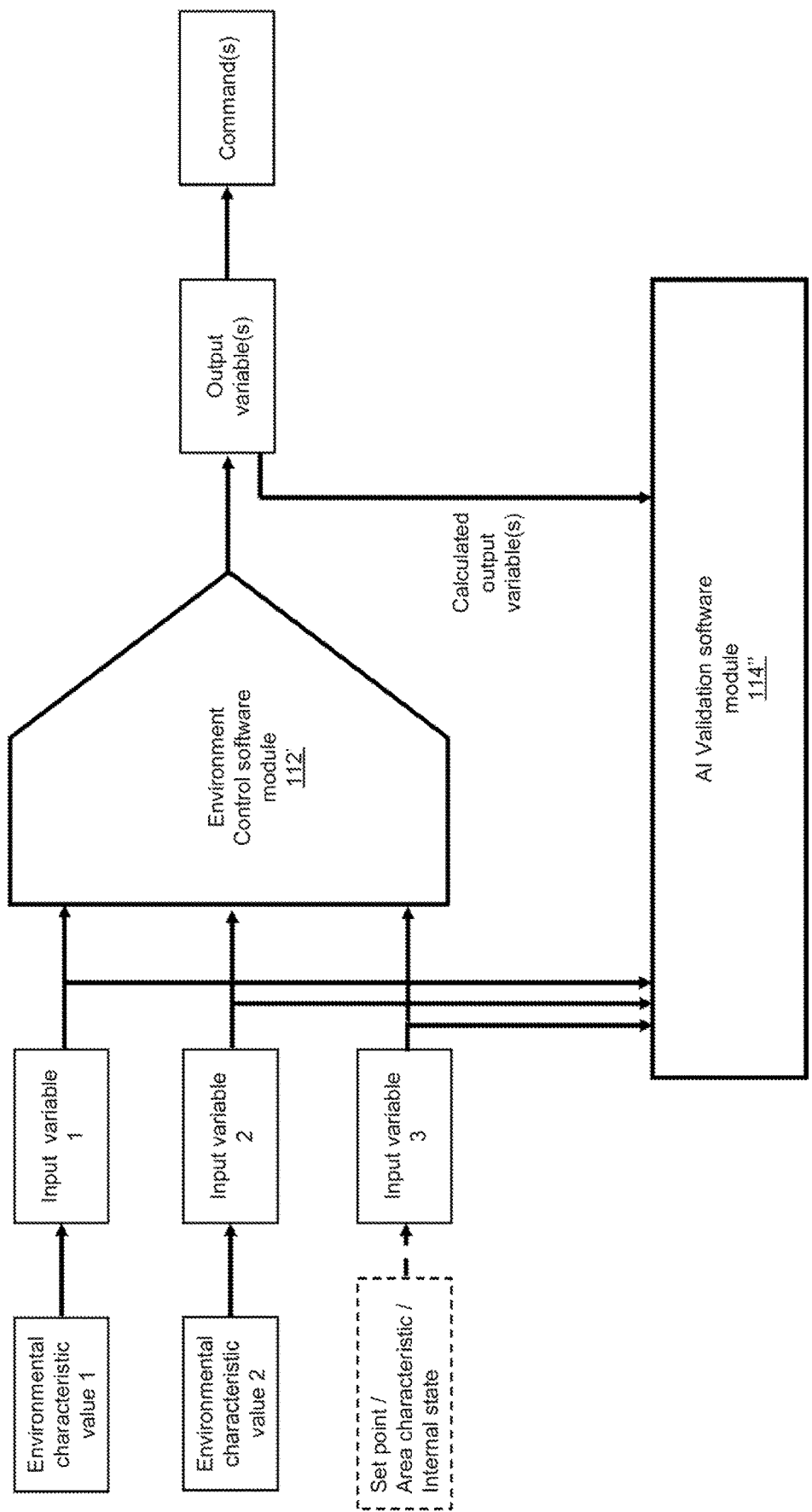
FIGS. 11A and 11B illustrate an AI validation software module executed by the environment controller of FIG. 10.

The method 800 comprises the step 812 of calculating at least one output variable based on the plurality of input variables determined at step 810. This step is performed by the environment control software 112 executed by the processing unit 110. More specifically, this step is performed by the environment control software module 112' as illustrated in FIG. 11A. As mentioned previously, the environment control software module 112' is a software module of the environment control software 112. This step is similar to step 515 of the method 500.

Figure 11B:
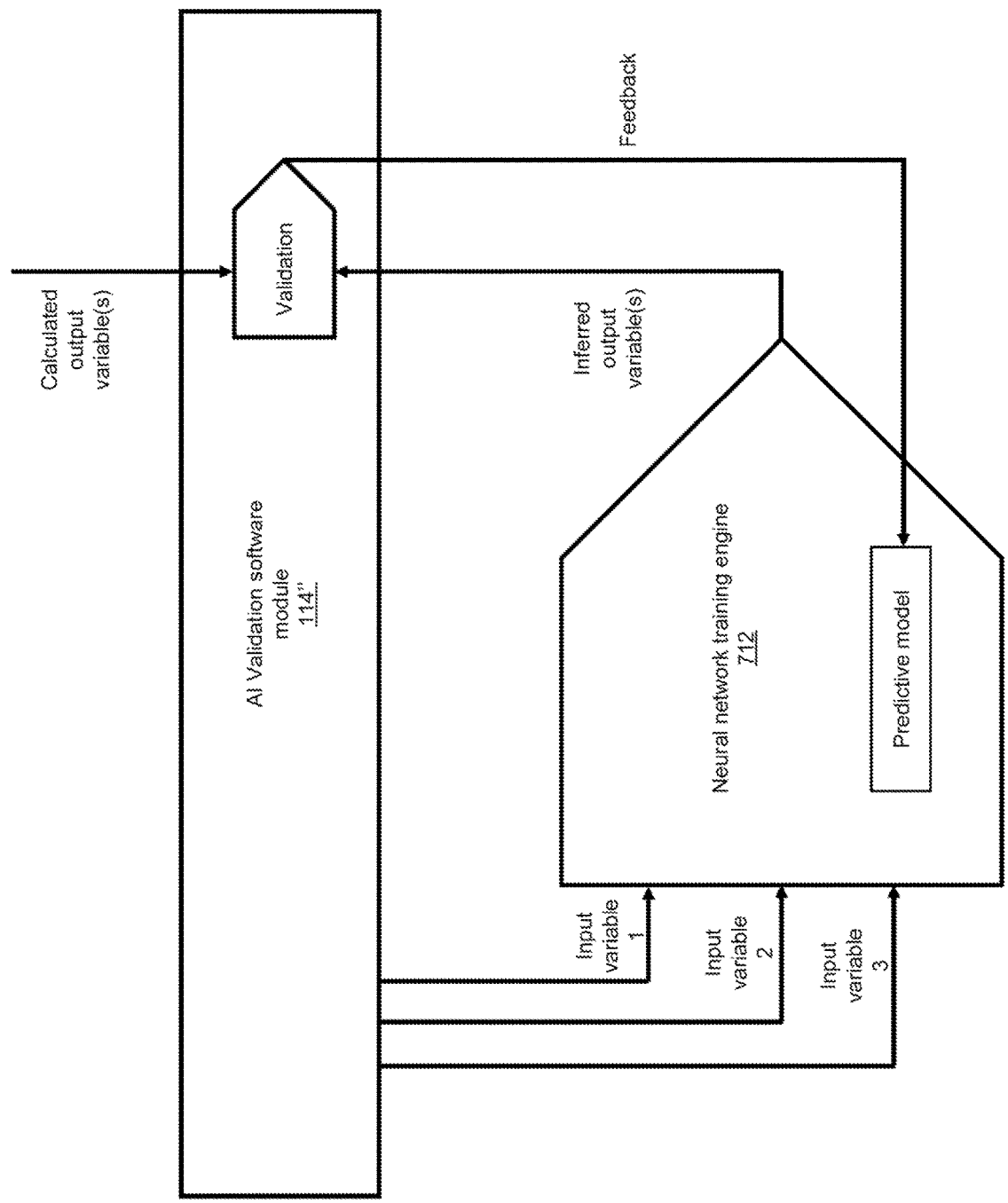

The method 800 comprises the step 815 of transmitting the plurality of input variables (determined at step 810) to the training server 700 via the communication interface 130. This step is performed by the AI validation software module 114" executed by the processing unit 110. This step is illustrated in FIGS. 11A and 11B.

The method 800 comprises the step 820 of receiving the plurality of input variables (determined at step 810) at the training server 700 via the communication interface 730 of the training server 700. This step is performed by the processing unit 710 of the training server 700. This step is similar to step 620 of the method 600.

The method 800 comprises the step 825 of executing the neural network training engine 712 using the predictive model stored in the memory 720 of the training server 700 for generating at least one inferred output variable based on the plurality of input variables received at step 820. This step is performed by the processing unit 710 of the inference server 700. This step is illustrated in FIG. 11B. This step is similar to step 625 of the method 600.

The method 800 comprises the step 830 of transmitting the inferred output variable(s) (inferred at step 825) to the environment controller 100 via the communication interface 730. This step is performed by the processing unit 710 of the inference server 700. This step is illustrated in FIG. 11B. This step is similar to step 630 of the method 600.

The method 800 comprises the step 835 of receiving the inferred output variable(s) (inferred at step 825) at the environment controller 100 via the communication interface 130. This step is performed by the AI validation software module 114" executed by the processing unit 110. This step is illustrated in FIG. 11B. This step is similar to step 635 of the method 600.

The following steps of the method 800 consist in performing a validation of the inferred output variables (received by the AI validation software module 114" at step 835) with the calculated output variables (calculated by the environment control software module 112' at step 812).

The method 800 comprises the step 840 of comparing each inferred output variable (received from the neural network training engine 712 of the training server 700) with the corresponding calculated output variable (calculated by the environment control software module 112'). This step is performed by the AI validation software module 114" executed by the processing unit 110. This step is illustrated in FIG. 11B.

The method 800 comprises the optional step 845 of displaying each calculated output variable (calculated by the environment control software module 112') and each corresponding inferred output variable (received from the neural network training engine 712 of the training server 700) on the display 150 of the environment controller 100. This allows a user of the environment controller 100 to verify the accuracy of the predictive model used by the neural network training engine 712. Additional information may be displayed on the display 150, such as for example a percentage of variation between each calculated output variable and the corresponding inferred output variable.

The method 800 comprises the step 850 of transmitting a feedback to the training server 700 via the communication interface 130 of the environment controller 100. This step is performed by the AI validation software module 114" executed by the processing unit 110. This step is illustrated in FIG. 11B.

The method 800 comprises the step 855 of receiving the feedback at the training server 700 via the communication interface 730 of the training server 700. This step is performed by the processing unit 710 of the training server 700. This step is illustrated in FIG. 11B.

The method 800 comprises the step 855 of receiving the feedback at the training server 700 via the communication interface 730 of the training server 700. This step is performed by the processing unit 710 of the training server 700. This step is illustrated in FIG. 11B.

The method 800 comprises the step 855 of receiving the feedback at the training server 700 via the communication interface 730 of the training server 700. This step is performed by the processing unit 710 of the training server 700. This step is illustrated in FIG. 11B.

The method 800 comprises the step 860 of adapting the predictive model of the neural network training engine 712 based on the feedback received at step 855. This step is performed by the processing unit 710 of the training server 700. This step is illustrated in FIG. 11B. The adaptation of the predictive model when the outputs of the neural network are not what they are expected to be is well known in the art of neural networks. It generally consists in adapting the weights of the predictive model via known techniques, such as back-propagation.

In a first implementation, the feedback transmitted at step 850 comprises of the output variable(s) calculated by the environment control software module 112' at step 812. The predictive model is adapted based on a difference between each inferred output variable determined at step 825 and the corresponding calculated output variable (comprised in the transmitted feedback).

In a second implementation, the feedback transmitted at step 850 comprises the result of the comparison performed at 840. The predictive model is adapted based on the transmitted result of the comparison. For example, the comparison performed at step 840 consists in determining for each inferred output variable (received from the neural network training engine 712 of the training server 700) whether a difference between the inferred output variable and the corresponding calculated output variable (calculated by the environment control software module 112' at step 812) is within a pre-defined range. For example, the pre-defined range consists of an acceptable percentage of variation (e.g. 5%). In some cases, the pre-defined range may allow no variation at all (the inferred output variable and the corresponding calculated output variable shall be exactly the same). For each inferred output variable, if the difference between the inferred output variable and the corresponding calculated output variable is within its pre-defined range, the feedback is an indicator that the value of the inferred output variable is correct. If the difference between the inferred output variable and the corresponding calculated output variable is not within its pre-defined range, the feedback is the difference between the inferred output variable and the corresponding calculated output variable.

The method 800 comprises the step 870 of generating one or more command for controlling the controlled appliance 300 based on one or more of the output variable(s) calculated at step 812. This step is performed by the environment control software module 112' executed by the processing unit 110. This step is similar to step 520 of the method 500. Step 870 has been represented after step 850 in FIG. 12B. However, the timing for performing step 870 may vary, as long as it after step 812. With the method 800, the inferred output variable(s) are not used for generating command(s) which are still generated based on the calculations of the environment control software module 112' (in a manner similar to the method 500).

Figure 12A:
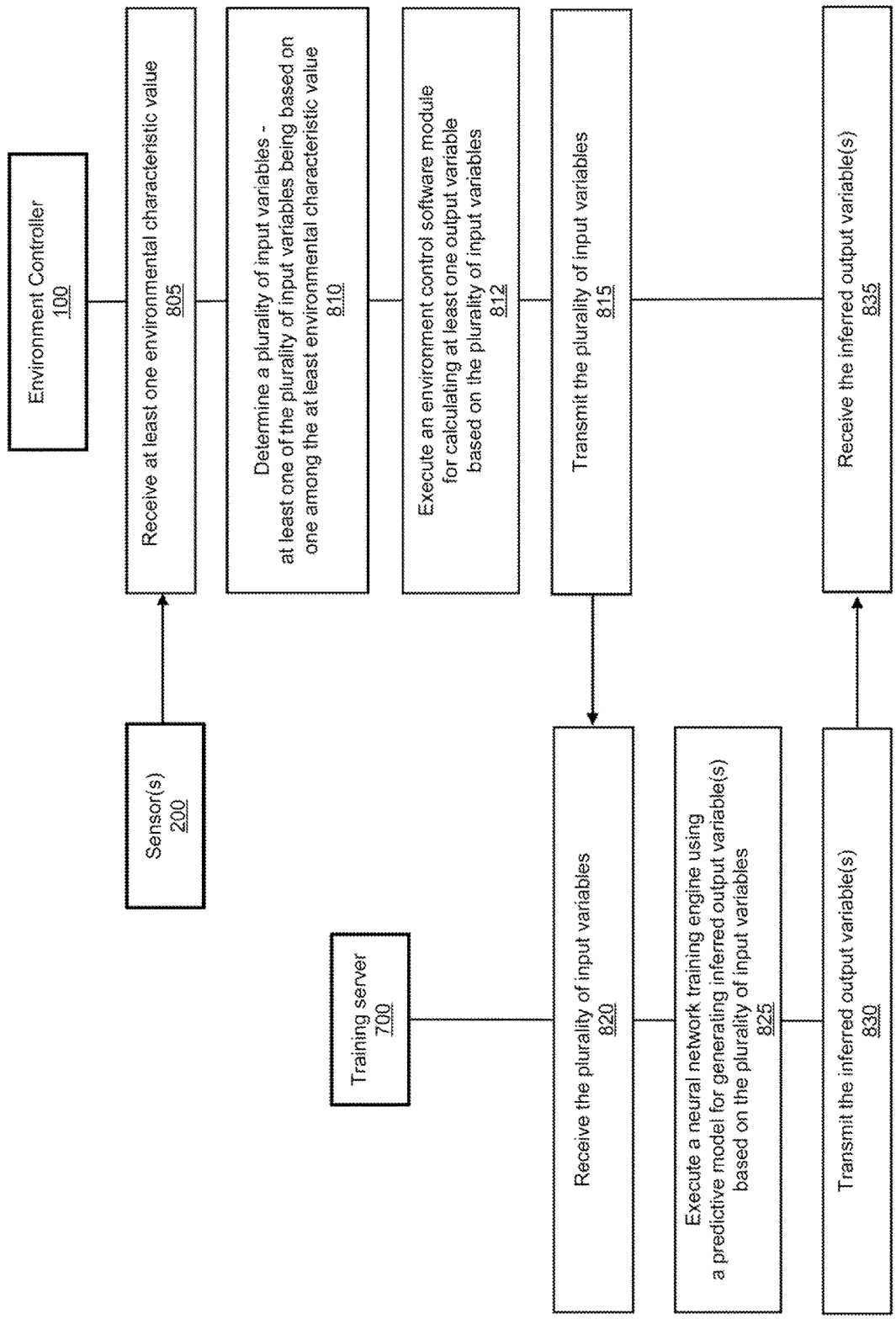
FIGS. 12A and 12B illustrate a method executed by the environment controller of FIG. 10 for validating the predictive model of the training server of FIG. 10.
Figure 12B:
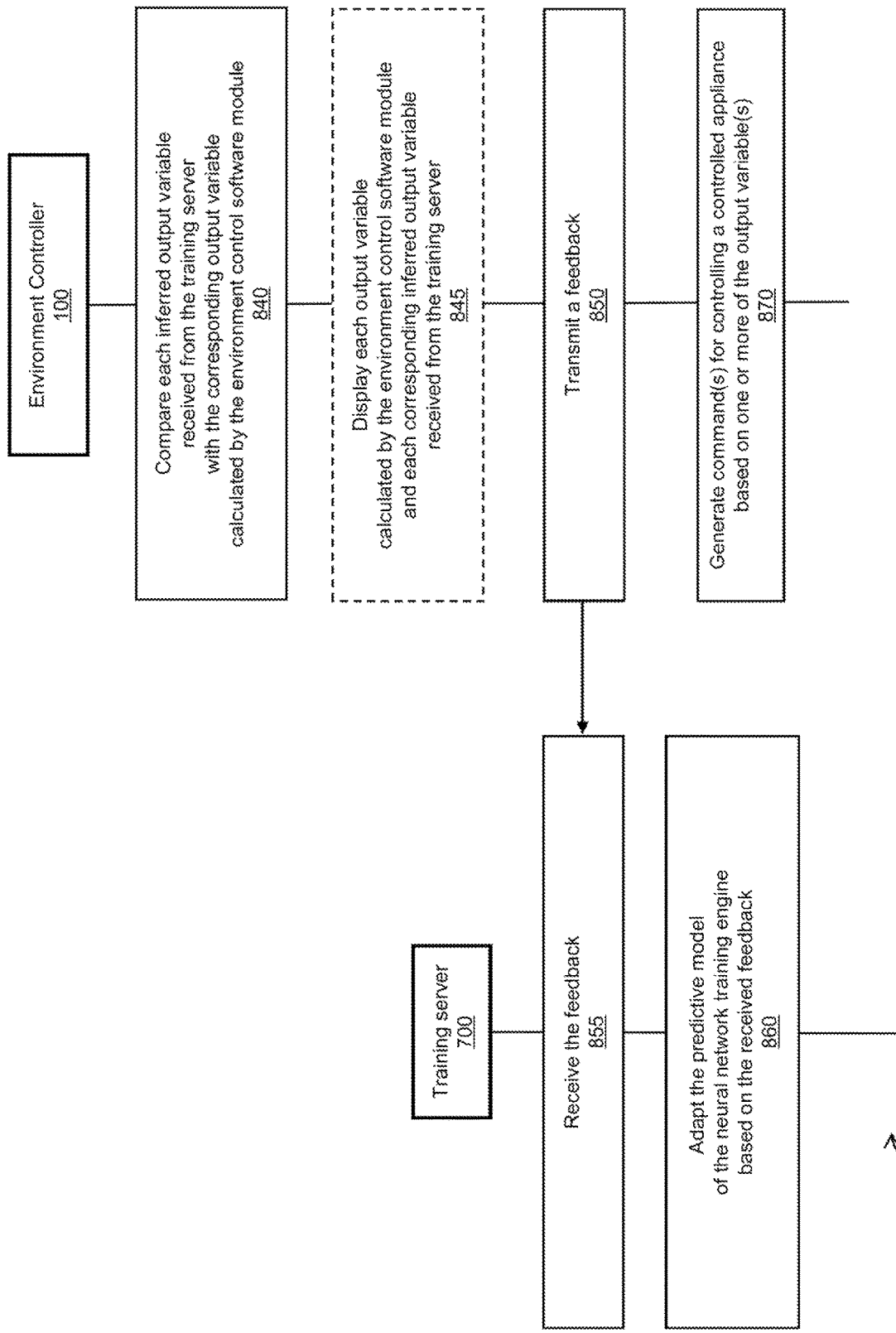

Although not represented in FIG. 12B for simplification purposes, the method 800 comprises an additional step (similar to step 525 of the method 500) of transmitting the command(s) to the controlled appliance 300 via the communication interface 130. This step is performed by the environment control software 112 executed by the processing unit 110.

Figure 13:
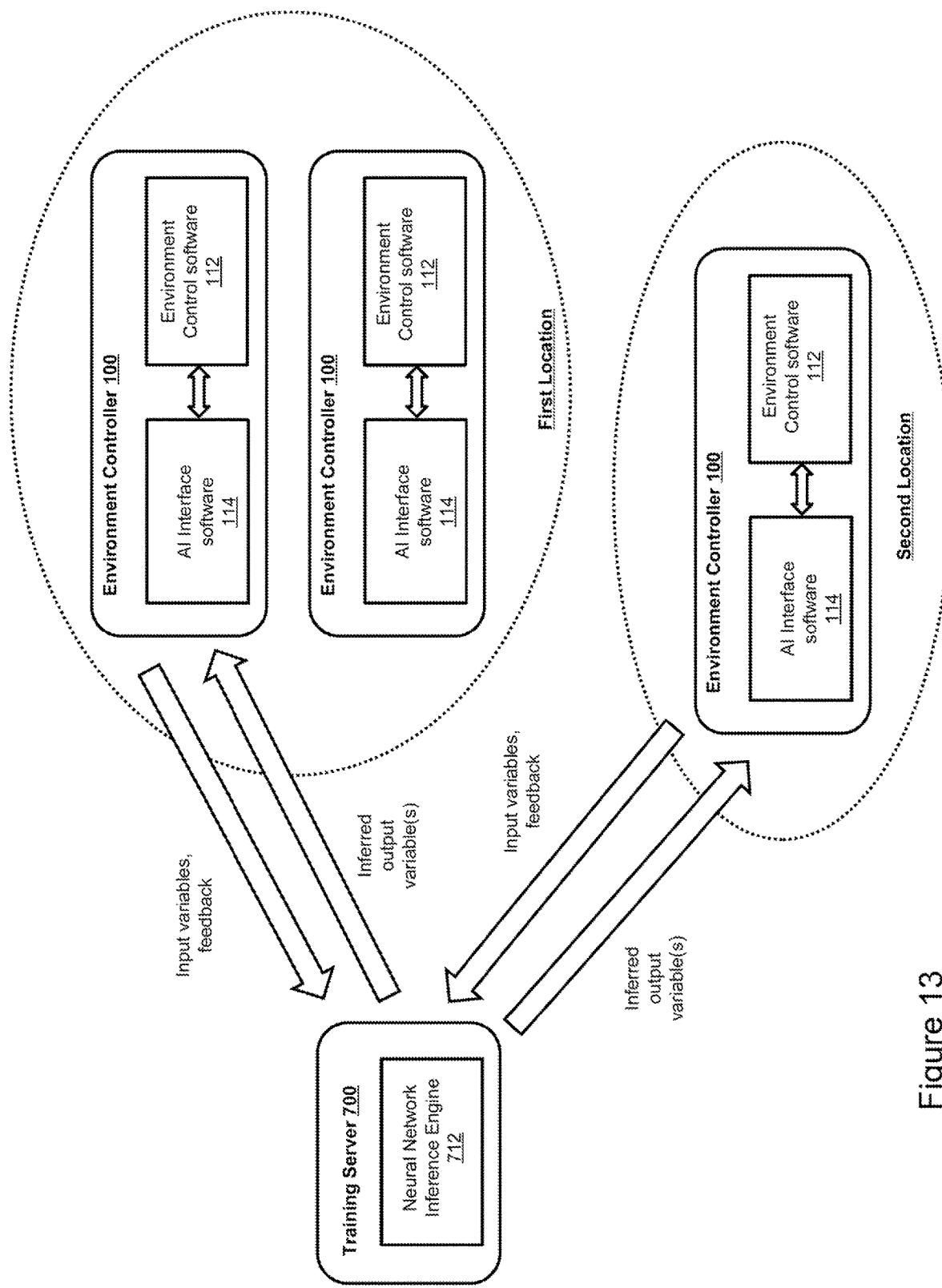
FIG. 13 represents an environment control system where a plurality of environment controllers of FIG. 10 implementing the method of FIGS. 12A-B are deployed.

Reference is now made concurrently to FIGS. 10, 12A, 12B and 13, where FIG. 13 illustrates the usage of the method 800 in a large environment control system.

FIG. 13 is similar to FIG. 9, except for the inference server 400 of FIG. 9 which is replaced by the training server 700 executing the neural network inference engine 712.

A first plurality of environment controllers 100 implementing the method 800 are deployed at the first location; and a second plurality of environment controllers 100 implementing the method 800 are deployed at a second location.

The environment controllers 100 correspond to the environment controllers represented in FIG. 10. Each environment controller 100 represented in FIG. 13 interacts with at least one sensor 200 and at least one controlled appliance 300, as illustrated in FIG. 10.

Each environment controller 100 executes both the environment control software 112 and the AI interface software 114. Each environment controller 100 transmits a plurality of input variables to the training server 700. Each environment controller 100 receives in response one or more inferred output variable from the training server 700. Each inferred output variable is validated by the AI interface software 114 (more specifically by the AI validation software module 114" represented in FIG. 11B) as described previously. Each environment controller 100 transmits a feedback to the training server 700 based on the result of the validation.

For instance, a cloud-based training server 700 is in communication with the environment controllers 100 via a networking infrastructure, as is well known in the art. The training server 700 executes the neural network inference engine 712 for validating and optionally adapting a predictive model. The same predictive model is used by the neural network inference engine 712 for all the environment controllers 100. Alternatively, a plurality of predictive models is used, taking into account specific operating conditions of the environment controllers 100. For example, a first predictive model is used for the environment controllers 100 controlling a first type of appliance 300, and a second predictive model is used for the environment controllers 100 controlling a second type of appliance 300. The validation and optional adaptation of each predictive model is performed through interactions with a given subset of the environment controllers 100 to which the predictive model is dedicated.

The exchange of data between the environment controllers 100 and the training server 700 rely on an Internet Protocol (IP) based networking infrastructure. Exemplary IP based protocols for exchanging the data include the Building Automation and Control networks (BACnet) protocol, HTTP web services compliant with the Representational State Transfer (REST), etc.

Figure 14:
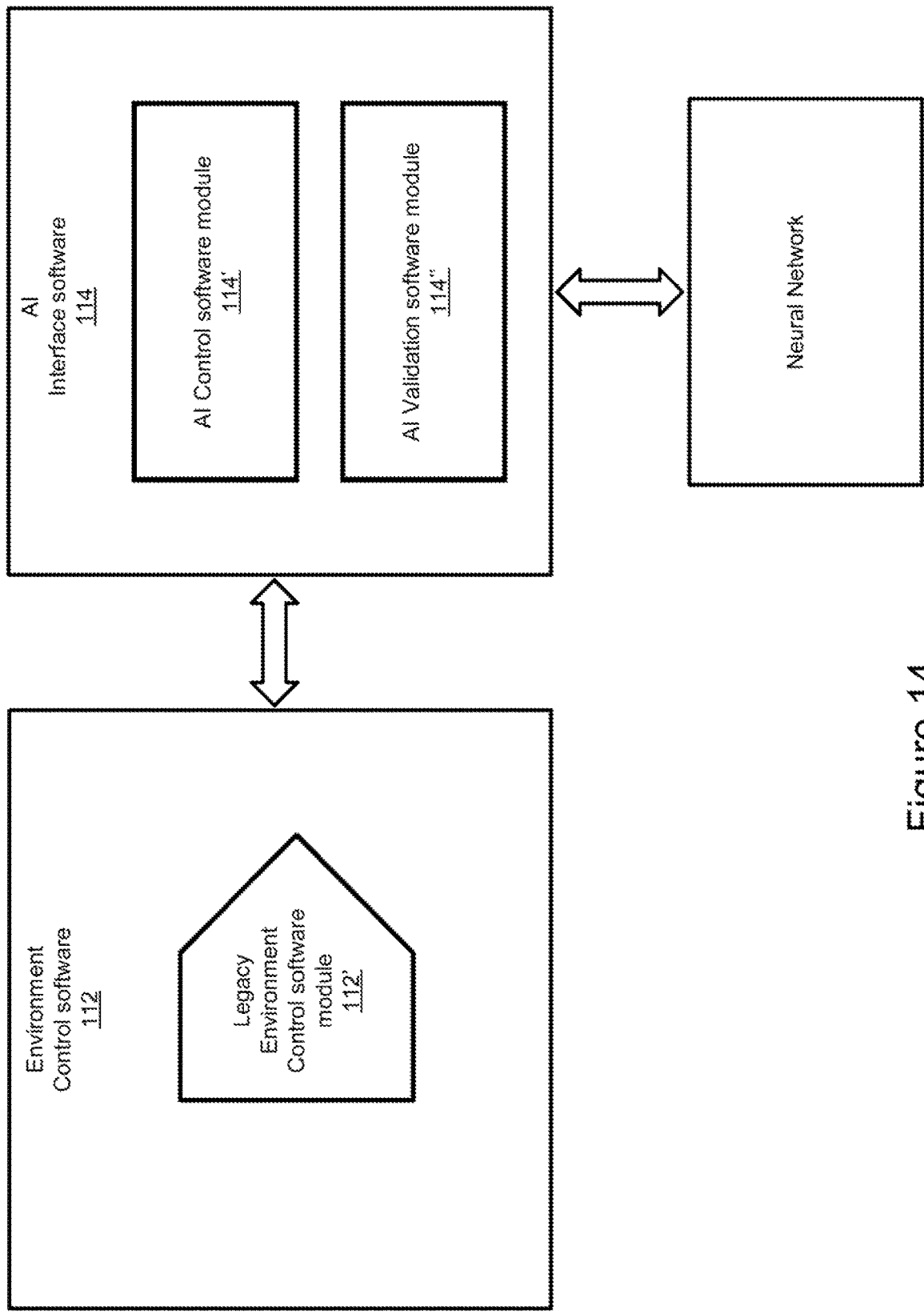
FIG. 14 illustrates the combination of the two AI software modules respectively represented in FIGS. 5A-C and 11A-B in a single AI interface software executable by any of the environment controllers of FIGS. 4 and 10.

Reference is now made concurrently to FIGS. 4, 10 and 14. FIG. 14 illustrates the AI interface software 114 comprising the AI control software module 114' represented in FIGS. 5A-C and the AI validation software module 114" represented in FIGS. 11A-B.

The AI interface software 114 can be configured (e.g. by a user via the user interface 140) to interact with the inference server 400 of FIG. 4 according to the method 600 of FIG. 7 or to interact with the training server 700 of FIG. 10 according to the method 800 of FIGS. 12A-B.

For example, in a first phase, the AI interface software 114 uses the AI validation software module 114" represented in FIGS. 11A-B to validate and optionally update the predictive model of the training server 700. In a second phase (when the validation is considered to have been achieved with a satisfactory level of accuracy for the predictive model), the AI interface software 114 uses the AI control software module 114' represented in FIGS. 5A-C to send commands to the controlled appliance 300 using the validated predictive model via the inference server 400. As mentioned previously, a single server can be used for implementing the training server 700 and the inference server 400.

Although the present disclosure has been described hereinabove by way of non-restrictive, illustrative embodiments thereof, these embodiments may be modified at will within the scope of the appended claims without departing from the spirit and nature of the present disclosure.

What is claimed is:
1. An environment controller, comprising:
a communication interface; and
a processing unit for:
receiving at least one environmental characteristic value via the communication interface;
determining a plurality of input variables, at least one of the plurality of input variables being based on one among the at least one environmental characteristic value;
calculating by a legacy environment control software module at least one output variable based on the plurality of input variables, the legacy environment control software module not implementing a neural network;
transmitting via the communication interface the plurality of input variables to a training server executing a neural network training engine;
receiving via the communication interface at least one inferred output variable from the training server, each inferred output variable corresponding to one of the at least one output variable calculated by the legacy environment control software module;
validating a predictive model used by the neural network inference engine executed by the training server by comparing each inferred output variable received from the training server with the corresponding output variable calculated by the legacy environment control software module; and
transmitting a feedback to the training server via the communication interface, the feedback comprising a result of the comparison of each inferred output variable received from the training server with the corresponding output variable calculated by the legacy environment control software module.

2. The environment controller of claim 1, wherein the comparison comprises determining for each inferred output variable whether a difference between the inferred output variable and the corresponding calculated output variable is within a pre-defined range.

3. The environment controller of claim 1, wherein the feedback further comprises each output variable calculated by the legacy environment control software module.

4. The environment controller of claim 1, wherein the processing unit further displays each output variable calculated by the legacy environment control software module and each corresponding inferred output variable received from the training server on a display of the environment controller.

5. The environment controller of claim 1, wherein the processing unit further generates one or more command for controlling a controlled appliance based on one or more of the at least one output variable calculated by the legacy environment control software module.

6. The environment controller of claim 1, wherein the environmental characteristic value comprises one of the following: a current temperature, a current humidity level, a current carbon dioxide ($CO_2$) level, and a current room occupancy.

7. The environment controller of claim 1, wherein at least one of the plurality of input variables is based on one of the following: a set point defined by a user, and a characteristic of an area of a building.

8. The environment controller of claim 2, wherein for each inferred output variable, if the difference between the inferred output variable and the corresponding calculated output variable is within its pre-defined range then the feedback comprises an indicator that the value of the inferred output variable is correct else the feedback comprises the difference between the inferred output variable and the corresponding calculated output variable.

9. A method for validating a predictive model of a neural network through interactions with an environment controller, the method comprising:
- receiving at least one environmental characteristic value via a communication interface of the environment controller;
- determining by a processing unit of the environment controller a plurality of input variables, at least one of the plurality of input variables being based on one among the at least one environmental characteristic value;
- executing by the processing unit a legacy environment control software module for calculating at least one output variable based on the plurality of input variables, the legacy environment control software module not implementing a neural network;
- transmitting by the processing unit via the communication interface the plurality of input variables to a training server executing a neural network training engine using the predictive model; and
- receiving by the processing unit via the communication interface at least one inferred output variable from the training server, each inferred output variable corresponding to one of the at least one output variable calculated by the legacy environment control software module;
- validating by the processing unit the predictive model used by the neural network inference engine executed by the training server by comparing by the processing unit each inferred output variable received from the training server with the corresponding output variable calculated by the legacy environment control software module; and
- transmitting by the processing unit a feedback to the training server via the communication interface, the feedback comprising a result of the comparison of each inferred output variable received from the training server with the corresponding output variable calculated by the legacy environment control software module.

10. The method of claim 9, wherein the comparison comprises determining for each inferred output variable whether a difference between the inferred output variable and the corresponding calculated output variable is within a pre-defined range.

11. The method of claim 9, wherein the feedback further comprises each output variable calculated by the legacy environment control software module.

12. The method of claim 9, further comprising displaying by the processing unit each output variable calculated by the legacy environment control software module and each corresponding inferred output variable received from the training server on a display of the environment controller.

13. The method of claim 9, further comprising generating by the processing unit one or more command for controlling a controlled appliance based on one or more of the at least one output variable calculated by the legacy environment control software module.

14. The method of claim 9, wherein the environmental characteristic value comprises one of the following: a current temperature, a current humidity level, a current carbon dioxide ($CO_2$) level, and a current room occupancy.

15. The method of claim 9, wherein at least one of the plurality of input variables is based on one of the following: a set point defined by a user, and a characteristic of an area of a building.

16. The method of claim 9, further comprising executing by a processing unit of the training server the neural network training engine using the predictive model for inferring the at least one inferred output variable based on the plurality of input variables.

17. The method of claim 16, wherein the predictive model is stored in a memory of the training server and comprises weights used by the neural network training engine.

18. The method of claim 9, further comprising adapting by a processing unit of the training server the predictive model based on the received feedback.

19. A non-transitory computer program product comprising instructions executable by a processing unit of an environment controller, the execution of the instructions by the processing unit providing for validating a predictive model of a neural network through interactions with the environment controller by:
- receiving at least one environmental characteristic value via a communication interface of the environment controller;
- determining by the processing unit of the environment controller a plurality of input variables, at least one of the plurality of input variables being based on one among the at least one environmental characteristic value;
- executing by the processing unit a legacy environment control software module for calculating at least one output variable based on the plurality of input variables, the legacy environment control software module not implementing a neural network;
- transmitting by the processing unit via the communication interface the plurality of input variables to a training server executing a neural network training engine using the predictive model;
- receiving by the processing unit via the communication interface at least one inferred output variable from the training server, each inferred output variable corresponding to one of the at least one output variable calculated by the legacy environment control software module;
- validating by the processing unit the predictive model used by the neural network inference engine executed by the training server by comparing by the processing unit each inferred output variable received from the training server with the corresponding output variable calculated by the legacy environment control software module; and
- transmitting by the processing unit a feedback to the training server via the communication interface, the feedback comprising a result of the comparison of each inferred output variable received from the training server with the corresponding output variable calculated by the legacy environment control software module.

20. The method of claim 10, wherein for each inferred output variable, if the difference between the inferred output variable and the corresponding calculated output variable is within its pre-defined range then the feedback comprises an indicator that the value of the inferred output variable is correct else the feedback comprises the difference between the inferred output variable and the corresponding calculated output variable.

* * * * *